(12) United States Patent
Lancaster-Larocque et al.

(10) Patent No.: US 10,864,686 B2
(45) Date of Patent: Dec. 15, 2020

(54) CONTINUOUS CARBON FIBER WINDING FOR THIN STRUCTURAL RIBS

(71) Applicant: Apple Inc., Cupertino, CA (US)

(72) Inventors: Simon R. Lancaster-Larocque, San Jose, CA (US); Ari P. Miller, San Francisco, CA (US); Christopher I. Owen-Elia, Santa Clara, CA (US); Paul X. Wang, Cupertino, CA (US); Robert Y. Cao, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/138,955

(22) Filed: Sep. 21, 2018

(65) Prior Publication Data

US 2019/0091946 A1 Mar. 28, 2019

Related U.S. Application Data

(63) Continuation of application No. 62/563,027, filed on Sep. 25, 2017.

(51) Int. Cl.
| | |
|---|---|
| *B29C 70/24* | (2006.01) |
| *B29C 70/56* | (2006.01) |
| *G06F 1/16* | (2006.01) |
| *H01H 13/04* | (2006.01) |
| *H01H 13/70* | (2006.01) |

(Continued)

(52) U.S. Cl.
CPC .............. *B29C 70/24* (2013.01); *B29C 70/48* (2013.01); *B29C 70/541* (2013.01); *B29C 70/543* (2013.01); *B29C 70/56* (2013.01); *G06F 1/1637* (2013.01); *G06F 1/1662* (2013.01); *G06F 3/0202* (2013.01); *H01H 13/04* (2013.01); *H01H 13/70* (2013.01); *B29C 70/345* (2013.01);

(Continued)

(58) Field of Classification Search
CPC ..... B29C 70/48; B29C 70/541; B29C 70/543; B29C 70/56; G06F 1/1637; G06F 1/1662; H01H 13/04; H01H 13/70
See application file for complete search history.

(56) References Cited

U.S. PATENT DOCUMENTS

| | | | |
|---|---|---|---|
| 1,775,813 | A | 9/1930 | Colby |
| 1,957,156 | A | 5/1934 | Barth et al. |

(Continued)

FOREIGN PATENT DOCUMENTS

| | | |
|---|---|---|
| CN | 1163640 | 10/1997 |
| CN | 1210567 | 3/1999 |

(Continued)

OTHER PUBLICATIONS

Author Unknown, "3M Microspheres Innovative Solutions for Demanding Applications," 3M Innovations, 6 pages, 2004.

*Primary Examiner* — Daniel P Wicklund
*Assistant Examiner* — Douglas R Burtner
(74) *Attorney, Agent, or Firm* — Brownstein Hyatt Farber Schreck, LLP

(57) ABSTRACT

Embodiments are directed to a keyboard or other input structure having a continuous fiber material. In one aspect, the continuous fiber material is disposed in a layered fiber pattern under tension. The continuous fiber material is continuous in that it is not broken or severed within the webbing. Heat and pressure are then applied to form a structural web. The resulting structural web may be stronger than a webbing of conventional materials yet with reduced relative weight.

20 Claims, 21 Drawing Sheets

(51) Int. Cl.
*G06F 3/02* (2006.01)
*B29C 70/48* (2006.01)
*B29C 70/54* (2006.01)
*B29C 70/34* (2006.01)
*B29K 105/08* (2006.01)
*B29L 31/34* (2006.01)
*B29K 307/04* (2006.01)
*B29K 63/00* (2006.01)

(52) U.S. Cl.
CPC .. *B29K 2063/00* (2013.01); *B29K 2105/0872* (2013.01); *B29K 2307/04* (2013.01); *B29L 2031/34* (2013.01); *H01H 2233/07* (2013.01)

(56) References Cited

U.S. PATENT DOCUMENTS

| | | | |
|---|---|---|---|
| 2,050,901 | A | 8/1936 | Sundell |
| 2,638,523 | A | 5/1953 | Rubin |
| 2,834,158 | A | 5/1958 | Petermann |
| 2,990,616 | A | 7/1961 | Kuris et al. |
| 3,131,515 | A | 5/1964 | Mason |
| 3,535,955 | A | 10/1970 | Stanley et al. |
| 3,802,040 | A | 4/1974 | Nomamoto |
| 3,814,016 | A | 6/1974 | Leach et al. |
| 3,957,715 | A | 5/1976 | Lirones et al. |
| 4,343,846 | A | 8/1982 | Kohn |
| 4,353,763 | A | 10/1982 | Simons |
| 4,439,298 | A | 3/1984 | Ford et al. |
| 4,467,168 | A | 8/1984 | Morgan et al. |
| 4,622,091 | A | 11/1986 | Letterman |
| 4,716,072 | A | 12/1987 | Kim |
| 4,849,145 | A | 7/1989 | Hirsch et al. |
| 4,934,103 | A | 6/1990 | Campergue et al. |
| 4,988,550 | A | 1/1991 | Keyser et al. |
| 5,009,821 | A | 4/1991 | Weaver |
| 5,052,153 | A | 10/1991 | Wiand |
| 5,064,707 | A | 11/1991 | Weaver et al. |
| 5,078,840 | A * | 1/1992 | Ogawa .................. D01F 11/16 205/768 |
| 5,101,599 | A | 4/1992 | Takabayasi et al. |
| 5,111,579 | A | 5/1992 | Andersent |
| 5,116,138 | A | 5/1992 | Macsenti et al. |
| 5,140,773 | A | 8/1992 | Miwa et al. |
| 5,213,881 | A | 5/1993 | Timmons et al. |
| 5,237,788 | A | 8/1993 | Sandow |
| 5,249,534 | A | 10/1993 | Sacks |
| 5,264,992 | A | 11/1993 | Hogdahl et al. |
| 5,358,344 | A | 10/1994 | Spence |
| 5,395,682 | A | 3/1995 | Holland et al. |
| 5,416,953 | A | 5/1995 | Hui |
| 5,439,330 | A | 8/1995 | Bayer et al. |
| 5,500,164 | A | 3/1996 | Livesay et al. |
| 5,503,506 | A | 4/1996 | Yuan |
| 5,556,670 | A | 9/1996 | Mihara et al. |
| 5,617,377 | A | 4/1997 | Perret, Jr. |
| 5,619,889 | A | 4/1997 | Jones et al. |
| 5,755,539 | A | 5/1998 | Takeuchi et al. |
| 5,865,569 | A | 2/1999 | Holstein et al. |
| 5,879,492 | A | 3/1999 | Reis et al. |
| 5,906,873 | A | 5/1999 | Kim et al. |
| 5,967,357 | A | 10/1999 | Kellogg et al. |
| 5,984,600 | A | 11/1999 | Gierth |
| 6,117,517 | A | 9/2000 | Diaz et al. |
| 6,117,546 | A | 9/2000 | Geiman et al. |
| 6,179,943 | B1 | 1/2001 | Welch et al. |
| 6,193,089 | B1 | 2/2001 | Yu |
| 6,267,036 | B1 | 7/2001 | Lani |
| 6,276,100 | B1 | 8/2001 | Woll et al. |
| 6,299,246 | B1 | 10/2001 | Tomka |
| 6,435,363 | B2 | 8/2002 | Fingerhut et al. |
| 6,437,238 | B1 | 8/2002 | Annerino et al. |
| 6,464,195 | B1 | 10/2002 | Hildebrandt et al. |
| 6,689,246 | B2 | 2/2004 | Hirahara et al. |
| 6,703,519 | B1 | 3/2004 | Buvat et al. |
| 6,775,908 | B2 | 8/2004 | Chara et al. |
| 6,846,221 | B2 | 1/2005 | Ulrich et al. |
| 6,871,527 | B2 | 3/2005 | Hansma et al. |
| 6,962,312 | B2 | 11/2005 | Shih |
| 6,973,815 | B2 | 12/2005 | Bryans et al. |
| 7,029,267 | B2 | 4/2006 | Caron et al. |
| 7,063,763 | B2 | 6/2006 | Chapman, Jr. |
| 7,068,343 | B2 | 6/2006 | Saitoh |
| 7,097,371 | B2 | 8/2006 | Hasunuma et al. |
| 7,115,323 | B2 | 10/2006 | Westre et al. |
| 7,191,555 | B2 | 3/2007 | Hughes |
| 7,238,089 | B2 | 7/2007 | Tsumuraya et al. |
| 7,326,012 | B2 | 2/2008 | Schlotter |
| 7,338,235 | B2 | 3/2008 | Weghaus et al. |
| 7,354,350 | B2 | 4/2008 | Glimpel |
| 7,393,577 | B2 | 7/2008 | Day et al. |
| 7,436,653 | B2 | 10/2008 | Yang et al. |
| 7,503,368 | B2 | 3/2009 | Chapman et al. |
| 7,527,321 | B1 | 5/2009 | Benderoth et al. |
| 7,534,501 | B2 | 5/2009 | Durney |
| 7,545,628 | B2 | 6/2009 | Takuma |
| 7,560,152 | B2 | 7/2009 | Rajabali et al. |
| 7,571,828 | B2 | 8/2009 | Palley et al. |
| 7,588,970 | B2 | 9/2009 | Ohnuma |
| 7,608,314 | B2 | 10/2009 | Plant |
| 7,628,879 | B2 | 12/2009 | Ackerman |
| 7,669,799 | B2 | 3/2010 | Elzey et al. |
| 7,710,728 | B2 | 5/2010 | Arisaka et al. |
| 7,735,644 | B2 | 6/2010 | Sirichai et al. |
| 7,762,028 | B2 | 7/2010 | Valentz et al. |
| 7,790,637 | B2 | 9/2010 | DiFonzo et al. |
| 7,934,676 | B2 | 5/2011 | Dufresne et al. |
| 7,963,483 | B2 | 6/2011 | Roming et al. |
| 7,971,400 | B2 | 7/2011 | Boldt et al. |
| 7,988,532 | B2 | 8/2011 | Choo et al. |
| 8,021,752 | B2 | 9/2011 | Honma et al. |
| 8,023,260 | B2 | 9/2011 | Filson et al. |
| 8,031,186 | B2 | 10/2011 | Ostergaard |
| 8,042,770 | B2 | 10/2011 | Martin et al. |
| 8,096,859 | B2 | 1/2012 | Schimweg |
| 8,252,133 | B2 | 8/2012 | Feng et al. |
| 8,317,257 | B2 | 11/2012 | Rolfe et al. |
| 8,324,515 | B2 | 12/2012 | Stevenson et al. |
| 8,325,094 | B2 | 12/2012 | Ayala Vasquez et al. |
| 8,334,226 | B2 | 12/2012 | Nahn et al. |
| 8,372,495 | B2 | 2/2013 | Kenney |
| 8,408,972 | B2 | 4/2013 | Kenney |
| 8,419,883 | B2 | 4/2013 | Day et al. |
| 8,511,498 | B2 | 8/2013 | Kenney |
| 8,562,886 | B2 | 10/2013 | DiFonzo |
| 8,691,037 | B2 | 4/2014 | Ingram et al. |
| 8,776,358 | B2 | 7/2014 | Gotham et al. |
| 8,857,128 | B2 | 10/2014 | Kenney |
| 8,963,782 | B2 | 2/2015 | Ayala Vasquez et al. |
| 9,011,623 | B2 | 4/2015 | Kenney et al. |
| 9,120,272 | B2 | 9/2015 | Kenney |
| 9,154,866 | B2 | 10/2015 | Bibl |
| 10,083,806 | B2 * | 9/2018 | Knopf .................. G06F 1/1662 |
| 2002/0195742 | A1 | 12/2002 | Beck et al. |
| 2003/0078070 | A1 | 4/2003 | Hsu |
| 2005/0097717 | A1 | 5/2005 | Rasmussen |
| 2005/0142369 | A1 | 6/2005 | Canady et al. |
| 2007/0134466 | A1 | 6/2007 | Rajaram et al. |
| 2008/0090477 | A1 | 4/2008 | Balthes et al. |
| 2008/0094372 | A1 | 4/2008 | Philipp |
| 2008/0169380 | A1 | 7/2008 | Jackson et al. |
| 2009/0041984 | A1 | 2/2009 | Mayers et al. |
| 2009/0142157 | A1 | 6/2009 | Wang et al. |
| 2009/0208721 | A1 | 8/2009 | Tsuchiya et al. |
| 2009/0267266 | A1 | 10/2009 | Lee et al. |
| 2010/0233424 | A1 | 9/2010 | Dan-Jumbo et al. |
| 2011/0180557 | A1 * | 7/2011 | Kenney .................. G06F 1/1613 220/669 |
| 2012/0003454 | A1 | 1/2012 | Younes |
| 2012/0012448 | A1 * | 1/2012 | Pance .................. H01H 13/83 200/5 A |
| 2012/0147592 | A1 | 6/2012 | Takase |
| 2013/0068601 | A1 * | 3/2013 | Sellers .................. G06F 3/0202 200/5 A |

(56) References Cited

U.S. PATENT DOCUMENTS

| | | |
|---|---|---|
| 2013/0148288 A1 | 6/2013 | Kenney |
| 2013/0273295 A1 | 10/2013 | Kenney et al. |
| 2014/0340208 A1* | 11/2014 | Tan ................... H01H 13/83 340/407.2 |
| 2014/0355194 A1* | 12/2014 | Shiraishi ............ H04M 1/0249 361/679.26 |
| 2015/0147543 A1* | 5/2015 | Guha ................... D01G 1/04 428/213 |
| 2015/0174854 A1 | 6/2015 | Siahaan et al. |
| 2016/0159300 A1* | 6/2016 | Matecki .............. B60R 19/18 293/120 |
| 2017/0182718 A1* | 6/2017 | Hsiao ................... C22C 47/12 |
| 2019/0101960 A1* | 4/2019 | Silvanto .............. G06F 1/1613 |

FOREIGN PATENT DOCUMENTS

| | | |
|---|---|---|
| CN | 2841707 | 11/2006 |
| CN | 1989281 | 6/2007 |
| CN | 101092944 | 12/2007 |
| CN | 101200828 | 6/2008 |
| CN | 102471944 | 5/2012 |
| CN | 103802323 | 5/2014 |
| CN | 204608330 | 9/2015 |
| DE | 10123400 | 2/2002 |
| EP | 0516560 | 12/1992 |
| EP | 1139638 | 10/2001 |
| EP | 2047983 | 4/2009 |
| EP | 2051572 | 4/2009 |
| JP | 03269187 | 11/1991 |
| JP | 2006123475 | 5/2006 |
| JP | 2007076202 | 3/2007 |
| JP | 2007186228 | 7/2007 |
| JP | 2009000843 | 1/2009 |
| JP | 2009030195 | 2/2009 |
| JP | 2010115732 | 5/2010 |
| WO | WO98/15404 | 4/1998 |
| WO | WO2008/133748 | 11/2008 |
| WO | WO2009/017571 | 5/2009 |

* cited by examiner

CONTINUOUS CARBON FIBER WINDING FOR THIN STRUCTURAL RIBS

CROSS-REFERENCE TO RELATED APPLICATION(S)

This application is a nonprovisional patent application of and claims the benefit of U.S. Provisional Patent Application No. 62/563,027, filed Sep. 25, 2017 and titled "Continuous Carbon Fiber Winding for Thin Structural Ribs," the disclosure of which is hereby incorporated herein by reference in its entirety.

FIELD

The described embodiments relate generally to input devices for computing systems. More particularly, the present embodiments relate to structures used in a keyboard of an electronic device.

BACKGROUND

Structures used in electronic devices may include relatively thin or narrow portions which define apertures, such as found in structural webbing for keyboards. Such structures are prone to structural failure at aperture edges due to reduced width and/or thickness. In electronic devices, design parameters may require relatively light weight with relatively strong structure. Traditional webbings are made of aluminum. Webbings made of carbon fiber laminate may promise a comparatively stronger yet lighter weight design than aluminum. However, if the apertures of the webbing are stamped from a carbon fiber laminate sheet, the fibers are indiscriminately severed which structurally weakens the web. For example, the webbing may become structurally weak at aperture edges due to, for example, cutting of fibers and/or minimal to no continuous fiber materials adjacent the aperture.

SUMMARY

In one embodiment, a method of forming a structural web for an electronic device is disclosed. The method may include placing a first end of a continuous fiber material within a first retention channel of a mold, the mold having multiple retention channels defining multiple apertures; laying the continuous fiber material within the first retention channel; laying the continuous fiber material within a second retention channel; repeatedly layering the continuous fiber material in a pattern to form a layered fiber web surrounding each of the multiple apertures; heating the layered fiber web; and compressing the layered fiber web, thereby forming the structural web.

In one aspect, laying the continuous fiber material in the first and second retention channels is performed while the fiber is under tension; the continuous fiber material is a single continuous carbon fiber; the first retention channel extends along a first axis; and the second retention channel extends along a second axis transverse to the first axis. In one aspect, the first retention channel extends along an axis; the second retention channel extends along the axis; laying the continuous fiber material within the first retention channel comprises laying the continuous fiber material in a first direction; and laying the continuous fiber material within the second retention channel comprises laying the continuous fiber material in a second direction that is opposite to the first direction. In one aspect, the method of forming a structural web for an electronic device further comprises applying an adhesive to each of the multiple retention channels. In one aspect, laying the continuous fiber material is performed under tension with a positioning tool. In one aspect, the continuous fiber material has a varying dimension. In one aspect, the continuous fiber material is a pre-impregnated fiber material.

In another embodiment, a method of forming a structural web for an electronic device is disclosed. The method may include engaging a mold comprising multiple retention channels with a tool, the tool configured to position and stretch a continuous carbon fiber material; attaching an end of the continuous carbon fiber material to a portion of a first retention channel of the multiple retention channels; stretching the continuous carbon fiber material along a length of the first channel; stretching the continuous carbon fiber material along additional retention channels of the multiple retention channels to form a layered fiber web; compressing the layered fiber web; and heating the layered fiber web while compressing the layered fiber web.

In one aspect, the mold comprises a tow fixture disposed in the first retention channel; and the continuous carbon fiber material is attached to the tow fixture. In one aspect, an adhesive is applied to the multiple retention channels before the end of the continuous carbon fiber material is secured. In one aspect, at least a portion of the layered fiber web comprises multiple segments of the continuous carbon fiber material adjacent and bonded to one another. In one aspect, the continuous carbon fiber material has a first diameter along a first segment within the first retention channel; the continuous carbon fiber material has a second diameter along a second segment within a second retention channel. In one aspect, the first retention channel is positioned along a major axis of the mold; and the second retention channel is positioned along a minor axis of the mold. In one aspect, the carbon fiber is stretched along the first retention channel a first number of times and stretched along the second retention channel a second number of times, the first number greater than the second number.

In another embodiment, a structural web for an electronic device may include a single continuous fiber material defining multiple apertures, the single continuous fiber material layered with itself to form a layered fiber web comprising layered walls surrounding each of the multiple apertures, wherein: the layered fiber web is heated and compressed to form the structural web.

In one aspect, the layered fiber web forms a planar structure defining multiple apertures. In one aspect, the layered fiber web comprises: a first layered wall; and a second layered wall adjacent the first layered wall; wherein the first layered wall is formed from a greater amount of the single continuous fiber material than the second layered wall. In one aspect, the single continuous fiber material is pre-impregnated with a resin; and the single continuous fiber material is configured to adhere to itself upon application of heat or pressure. In one aspect, the single continuous fiber material is of non-uniform diameter. In one aspect, the layered fiber web further comprises a tow fixture at each corner of the layered fiber web.

In another embodiment, an electronic device may include a display portion comprising a display and a base portion pivotally coupled to the display portion. The base portion may include a housing a keyboard coupled to the housing. The keyboard may include a key web comprising a continuous carbon fiber defining an aperture and encapsulated in a matrix material and a keycap positioned at least partially in the aperture. The aperture may be defined by four walls and the continuous carbon fiber may at least partially define each of the four walls. The key web may define multiple additional apertures and the keyboard may further include a respective additional keycap positioned in each respective additional aperture.

The electronic device may further include a conductive conduit encapsulated at least partially in the matrix material. The conductive conduit may conductively couple a first component of the electronic device with a second component of the electronic device.

The keyboard may further include a substrate and a key assembly coupled to the substrate and movably supporting the keycap above the substrate. The key web may be attached to the substrate. The matrix material may be a first matrix material, the substrate may include a second matrix material at least partially encapsulating a reinforcing material, and the first and second matrix materials may be co-cured to define a unitary matrix structure.

BRIEF DESCRIPTION OF THE DRAWINGS

The disclosure will be readily understood by the following detailed description in conjunction with the accompanying drawings, wherein like reference numerals designate like structural elements, and in which.

Figure 1:
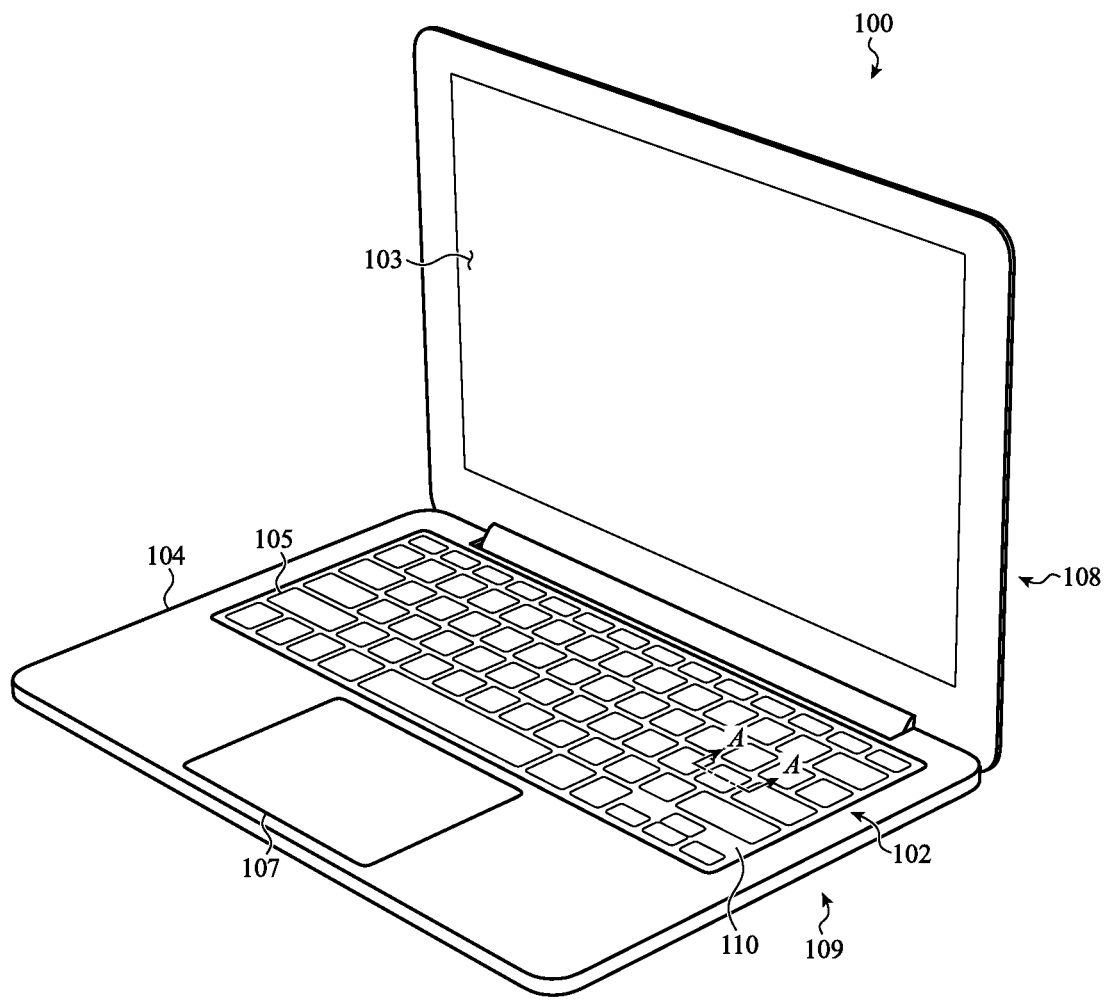
FIG. 1 illustrates one example of an electronic device with a structural web.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure generally relates to structures used in electronic devices, such as housings, plates and reinforcing constructs, attachments (such as bosses, protrusions, detents, and the like), and so on. Certain embodiments may take the form of structures which include relatively thin or narrow portions that define apertures, such as a keyboard web or plate (also referred to herein as a "structural web," "key web," or simply "web"). Key webs include multiple apertures to allow placement of keys or keycaps, typically from below the key web. The key may protrude or project beyond an upper surface of the web to allow access by a user. The apertures of the structural webbing are defined by relatively narrow and/or thin ribs of the structural webbing.

In portable electronic devices, such as laptop computers, key webs may provide structural rigidity to the overall device. For example, a key web may essentially define part of a top wall of a housing of a laptop computer, and as such may be a structural component of the housing. Accordingly, key webs with improved mechanical properties (e.g., strength, stiffness, toughness, etc.) may improve the mechanical properties of the overall housing. More particularly, a stiffer, stronger key web may produce a stiffer, stronger laptop housing.

As one example, the disclosure provides a structural web for keyboards (or other input devices) that uses a continuous fiber material repeatedly layered to form the web. The single continuous fiber material may be layered with itself to form a layered fiber web. Stated another way, a single unbroken length of fiber is strung in a pattern that defines the keyboard web; the fiber is routed in a pattern multiple times such that the fiber is layered with or otherwise adjacent to earlier passes of the fiber. Typically, the continuous fiber material is a single length of unbroken carbon fiber, although in some embodiments multiple aligned carbon fibers may form the continuous fiber material. The layered fiber web may surround and define each of the multiple apertures of the layered fiber web, and may form layered walls. A matrix material, such as an adhesive or resin, may encapsulate the layers or passes of the fiber and bond them together.

A structural web formed from a single continuous fiber material, such as a carbon fiber, provides several features. Generally, a continuous fiber structural web may have reduced weight compared to a structural web made from conventional materials, such as aluminum, while maintaining equivalent or even increased strength. Also, a continuous fiber structural web may have increased strength compared to a structural web made by stamping a composite sheet, such as a carbon fiber sheet. A structural web made from a stamped composite sheet often has structural vulnerabilities caused by the indiscriminate severing of carbon fibers to form the apertures through which keys extend, and also may have few (if any) fibers running along a length of either a major or minor axis of a keyboard. Thus, a composite structural keyboard or other web manufactured by conventional stamping methods may have reduced strength relative to a similar structural web made of metal such as aluminum.

Further, because the structural web is formed using an additive process (e.g., arranging a carbon fiber into a particular shape), other structures and/or components may be formed into and/or incorporated with the carbon fibers and matrix material to form more complex components that provide functionality beyond that of a typical key web. For example, components such as antennas, wires, conductors, light sources, light pipes, and the like, may be built into the key web. Such components may be put in place during the process of positioning the carbon fiber, and then encapsulated (fully or partially) in the same matrix that encapsulates the carbon fiber. Such components may be used, for example, to route electrical signals between various components of the laptop computer, to send and/or receive wireless communications, illuminate the key web or other portions of the laptop computer, and so forth.

Additionally, the additive manufacturing process may be used to build more complex structures than a web that simply defines a group of key openings. For example, bottom surfaces may be formed within the key openings (using the same carbon fiber used to define the walls of the key openings) to support key mechanisms, hinges, switches, and the like. In some cases, keycap support structures may be built directly into the bottom surfaces to support the keycap and optionally provide tactile feedback to the key. Other types of structures, such as carbon filaments extending across key openings, venting structures, flexible cover members, and the like may also be incorporated with the carbon fiber key webs, as described in greater detail herein.

As used herein, a "carbon fiber" may refer to a fiber made of carbon atoms, which may typically be 5-10 μm in diameter or thickness. A carbon fiber is commonly combined with other materials, such as a matrix material (which may be a resin). When a carbon fiber is combined with a plastic resin or other matrix material, a carbon fiber reinforced polymer (CFRP) is formed. A carbon fiber may also be combined with other materials, such as graphite, forming a carbon-carbon composite material. Non-polymer materials may also be combined with carbon fibers. Any of the foregoing may be used as a carbon fiber in accordance with embodiments herein.

A "composite material" is a material made from two or more constituent materials that, when combined, produce a material having material properties different than either of the individual components. For example, a carbon fiber, when combined with a matrix material, produces a composite material. Constituent materials used in embodiments described herein typically include one matrix material and one reinforcement material, though other configurations are also contemplated. As noted above, a matrix material may be a binder that supports and holds the reinforcement material together, while the reinforcement material provides the bulk of the composite's strength (or another material property). In the carbon fiber reinforced polymer example, the matrix material is a resin and the carbon fiber is the reinforcement material. The degree to which the matrix material is combined with the reinforcement material will influence the material properties of the composite material.

A key web that includes continuous fibers, as described herein, may have an improved strength-to-weight ratio as compared to a conventional web (e.g., a web formed of metal or plastic). For example, because the apertures of the key web are integrally formed during the manufacturing process, rather than stamped or cut-out, no fibers within the web structure are split, chopped, sliced or the like. Also, the continuous fiber material may extend along the length of the major axis, and in some embodiments across the minor axis, of the key web, thereby providing increased strength, as the fibers may be aligned with the principle stress orientations of the key web. Furthermore, in some embodiments, an increase in density of stacked or layered fiber may be provided at structurally sensitive locations of the web, such as at aperture corners and at intersections of ribs. Further, the ribs (or other structures formed by the continuous fiber material) may have varying thicknesses and/or densities (or other dimensions) at different points in the web. Such variable density and/or thickness of the fibers of the structural web may further increase strength of the structural web in key areas.

A continuous fiber structural web may also have improved heat resistance, because a compact layer of stacked carbon fibers efficiently reflects heat. Such a characteristic may be beneficial if the structural web forms a keyboard structural web disposed above electronic components that generate significant heat, like a battery or processing unit.

In one example, a structural web is formed by repeatedly layering a single continuous fiber material in a keyboard web pattern that is defined by multiple retention channels of a mold. An end of the fiber is positioned in a first retention channel of the mold. The fiber is stretched under tension along the remaining portion of the retention channel and then routed throughout remaining retention channels. The single continuous fiber material is repeatedly routed though the retention channels, forming layered walls surrounding each of the multiple apertures of the mold and forming a layered fiber web. Adhesive is applied to the layered fiber web. The layered fiber web is then heated and compressed to form a structural web made of a carbon fiber reinforced polymer.

In one embodiment, the single continuous fiber material is pre-impregnated with an adhesive, thereby removing the step of adding adhesive to the mold retention channels and/or the layered fiber web prior to heating and/or compression. The application of heat and/or pressurization causes polymerization of the adhesive matrix with the fiber reinforcement material to form a composite material such as a carbon fiber reinforced polymer.

A "pre-impregnated" or "pre-preg" fiber is a fiber in which a thermoset polymer matrix material, such as a resin or epoxy, is coupled to the fiber to form a composite material. Stated another way, a pre-preg fiber includes an adjacent resin or epoxy and, when fully cured (such as by heating and/or pressure), forms a composite material, such as a carbon fiber reinforced polymer.

Multiple pre-preg fibers may be woven or weaved together prior to curing. The multiple pre-preg fibers are held together with the resin, yet may remain uncured until exposed to increased heat and/or pressure. Such bundles of pre-preg fibers may require temperature control prior to and during use to prevent premature curing.

In one embodiment, the mold includes one or more tow fixtures to secure an end or portion of the continuous fiber material. For example, a tow fixture may be positioned at one end of a first retention channel of a mold, such that an end of the continuous fiber material attached to the tow fixture. The tow fixture secures the end of the continuous fiber material such that the fiber may be stretched under tension and stretched across or along the remaining portion of the retention channel. A tow fixture may also be positioned at one or more locations of direction changes or turns of the fiber. For example, a tow fixture may be located at the intersection of a first retention channel positioned along a major axis of a mold and a second retention channel positioned along a minor axis of a mold. The tow fixture allows a change in direction of the fiber without the fiber pressing against an inside wall of the retention channel.

In one embodiment, the single continuous fiber material is of non-uniform diameter. For example, the fiber may have a first diameter for a first length, and a second diameter for a second length. A fiber with non-uniform diameter allows a different configuration of fibers to be positioned in different areas of a fiber web without the requirement to layer the fiber to increase fiber density. For example, a fiber may have a first (and larger) diameter along a first length, such as along a major axis of a structural web, and a second diameter for a second length, such as along a minor axis of a structural web. The second diameter may be smaller than that of the first length. Thus, the fiber positioned in the first retention channel will be provide a relatively increased fiber density as compared to that provided in the second retention channel. In one embodiment, the fiber is of two diameters, the fiber diameter alternating between a first diameter and a second diameter. Further, in some embodiments, a thickness, width, height or the like may vary between first and second lengths; this may enable fiber materials of varying dimensions that are not cylindrical or ovoid. As used herein, "fiber density" may refer to a number of fibers in a cross-sectional area of a key web.

In one embodiment, the laying or positioning of the continuous fiber material is performed with a positioning tool. The positioning tool may be used in any of several ways. For example, the positioning tool may position the fiber within a particular retention channel of the mold under a selectable tension. The positioning tool may secure an end of the fiber to a particular location within a retention channel, and/or may secure an end of the fiber to a tow fixture positioned on or in the mold, such as within a retention channel. In embodiments where other types of fibers or other components (e.g., wires, conductors, antennas, light pipes, flexible or fabric covers, etc.) are incorporated into the key web, they may be positioned in the mold during the process of positioning the fibers in a mold. For example, a first number of passes of a carbon fiber may be positioned in a mold, after which a different fiber or a component may be positioned in the mold. After positioning the different fiber or component, the positioning tool may resume positioning the carbon fiber in the mold. After all of the carbon fiber and the additional fiber(s) and/or component(s) are positioned, the web may be cured to form the final component.

In one embodiment, the laying or positioning of the continuous fiber material (as well as optional additional fiber(s) and/or component(s)) is performed with an automated positioning tool, such as a computer numeric control (CNC) machine. An automated positioning tool facilitates laying the material as a continuous process through computer control. Furthermore, an automated positioning tool facilitates precision application of tension to the fiber in addition to precision positioning. Stated another way, an automated positioning tool, such as a CNC machine, allows a uniform tension to be applied to a single continuous fiber material. Also, an automated positioning tool may be programmed to route the continuous fiber material through multiple channels of a mold, the multiple channels defining multiple apertures of a pattern that defines a keyboard structural web.

It will be appreciated that while the foregoing describes a structural web used for a keyboard, other structures are contemplated within the scope of the present disclosure. Further, the structural web may be used with any appropriate electronic device and is not limited to a laptop computer or keyboard. Sample devices include other key entry electronic devices, as described herein. As such, the discussion of any electronic devices meant as illustrative only.

These and other embodiments are discussed below with reference to FIGS. 1-18. However, those skilled in the art will readily appreciate that the detailed description given herein with respect to these Figures is for explanatory purposes only and should not be construed as limiting.

FIG. 1 depicts an example electronic device 100 having a housing 104 and a keyboard 102 incorporated therein. The keyboard may be positioned at least partially within the housing 104. The keyboard 102 may include a stack-up of layered components that cooperate to initiate an input signal in response to a force input. The keyboard 102 may include a structural web, such as the structural web as discussed above and described in greater detail below. As described herein, the structural web (not shown in FIG. 1) may be configured to provide structural integrity and strength internal components and assemblies of the keyboard 102 and an external environment. In some embodiments, the housing itself, or a portion of the housing such as the web between the keys and/or surrounding the keys, may be formed as a web in accordance with embodiments described herein. That is, the housing and/or a portion thereof may be formed as a layered structure from a single, continuous fiber material as discussed herein.

As shown, the electronic device 100 (or "device 100") is a laptop computer, though it can be any suitable electronic device, including, for example, a desktop computer, a smart phone, an accessory, or a gaming device. Moreover, while the keyboard 102 in FIG. 1 is incorporated with the electronic device 100, the keyboard 102 may be separate from the electronic device 100. For example, the keyboard 102 may be a standalone device that is connected (via a cable or wirelessly) to the electronic device 100 as a peripheral input device. The keyboard 102 may also be integrated into another product, component, or device, such as a cover or case for a tablet computer. In such cases, the housing 104 may refer to a housing of any product, component, or device in which the keyboard 102 is integrated or otherwise positioned.

The electronic device 100 may also include a display 103 within the housing 104. In various embodiments, the housing 104 may be constructed from any suitable material, including metals (e.g., aluminum, steel, titanium), polymers, ceramics (e.g., zirconia, glass, sapphire), and the like. In one embodiment, the housing 104 is constructed from multiple materials. The housing 104 can form an outer surface or partial outer surface and protective case for the internal components of the electronic device 100, and may at least partially surround the display 103. The housing 104 can be formed of one or more components operably connected together, such as a front piece and a back piece. Alternatively, the housing 104 can be formed of a single piece operably connected to the display 103.

The display 103 may be within or otherwise coupled to a display portion 108 of the housing 104 that is configured to pivot relative to a second portion 109 of the housing 104. The display 103 can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 103 provides a graphical output, for example associated with an operating system, user interface, and/or applications of the electronic device 100. In one embodiment, the display 103 includes one or more sensors and is configured as a touch-sensitive (e.g., single-touch, multi-touch) and/or force-sensitive display to receive inputs from a user. The display 103 is operably coupled to a processor of the electronic device 100

The keyboard 102 may be within or otherwise coupled to or incorporated with the second portion 109 (also referred to as a base portion) of the housing 104. The keyboard 102 includes a set of key assemblies having a keycap or other input surface configured to receive a force input, including a representative key assembly 105. While the instant application describes components of a representative keyboard 102, the concepts and components described herein apply to other depressible input mechanisms as well, including key entry devices, card reader devices, standalone keys, switches, or the like. Moreover, such keys, buttons, or switches may be incorporated into other devices, including smart phones, tablet computers, or the like. Suitable input mechanisms may also include trackpads, mice, joysticks, buttons, and so on.

For purposes of illustration, FIG. 1 depicts the electronic device 100 as including the keyboard 102, the housing 104, a display 103, and one or more input/output members 107. It should be noted that the electronic device 100 may also include various other components, such as one or more ports (e.g., a charging port, a data transfer port, or the like), communications elements, additional input/output members (including buttons), and so on. As such, the discussion of any computing device, such as the electronic device 100, is meant as illustrative only.

Figure 2:
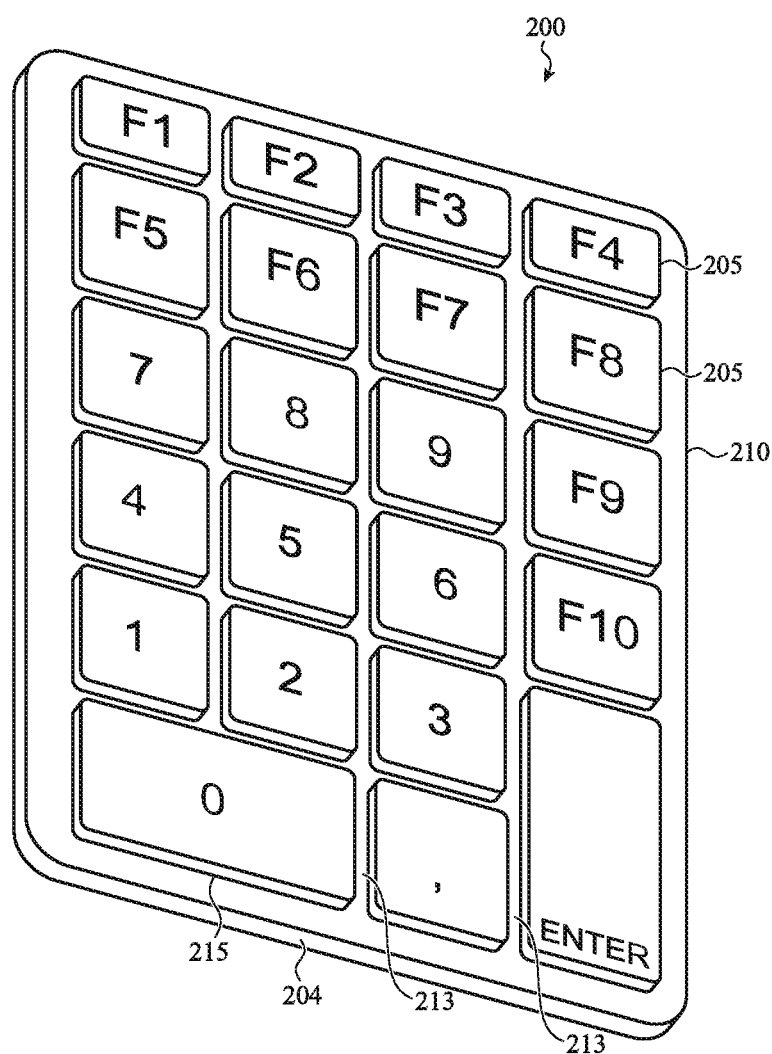
FIG. 2 illustrates another example of an electronic device with a structural web.

FIG. 2 illustrates another example of an electronic device 200, namely a keypad. The electronic device 200 includes a housing 204, of which only a portion is shown; a structural web 210 defines an upper portion of the housing 204. The keypad has multiple keys 205 extending through the structural web 210. The keypad depicted may be used in any of several ways, such as a control input for a home heating and cooling unit, a security unit, and the like.

The structural web 210 includes multiple apertures 215 defined by multiple ribs 213. A key 205 fits within each aperture 215 and extends from the aperture 215 to slightly above an upper surface of the structural web 210. Some ribs 213 extend across an entire axis of the keypad. For example, the ribs defining the set of four keys 205 of the upper four rows of the keypad extend horizontally from the left to the right side of the keypad, across substantially a width of the keypad 200. Similarly, the far right column of keys 205 (from the "F4" key to the "enter" key) includes a rib extending substantially the length of the keypad.

Figure 3A:
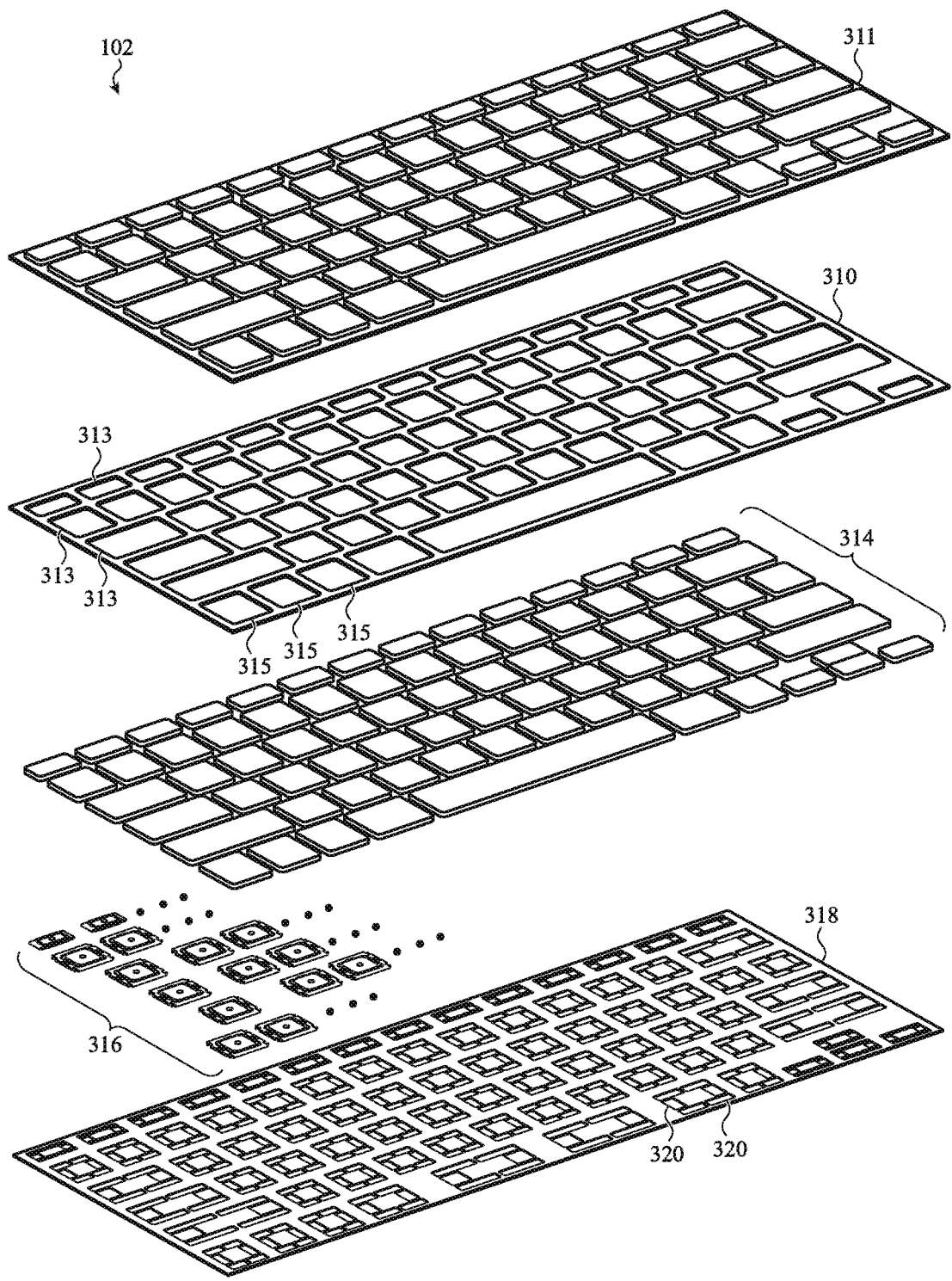
FIG. 3A is a sample exploded view of portions of a keyboard of an electronic device with a structural web.

FIG. 3A shows an exploded view of portions of a keyboard 102 of an electronic device with a structural web 310. The keyboard 102 includes a flexible cover 311 (which may be omitted in many embodiments), structural web 310, keycaps 314, switch assemblies 316, and a substrate 318. As used herein, the structural web 310, the keycaps 314, the switch assemblies 316, and/or other components or assemblies of the keyboard 102 may be discussed individually or collectively.

The structural web 310 may be part of, or affixed to, the housing 104 (FIG. 1), and may define a group of openings 315 configured to receive keycaps 314 therein. The structural web 310 may also include other openings (not shown) for other buttons, input mechanisms, touchpads, microphones, speakers, and/or other components or assemblies.

The keycaps 314 may be coupled to switch assemblies 316 and may be manipulated (e.g., pressed or actuated) by a user to provide input to the electronic device 100. For example, the keycaps 314 may be positioned over collapsible domes of the switch assemblies 316 such that when the keycaps 314 are pressed, the collapsible domes are collapsed to actuate the key and close a switch that allows the electronic device 100 to register an input.

The switch assemblies 316 may include components that facilitate mechanical and electrical operations of the keyboard 102. For example, the switch assemblies 316 may include a switch housing, a dome or other switching element, and a support structure such as a scissor or hinge mechanism. The switch assemblies may be formed on or coupled to a substrate 318. In some embodiments, the substrate 318 may also be formed from a continuous fiber material in a fashion similar to the structural web 310, and may be co-cured with the structural web 310 to form a single, rigid component. The substrate 318 may be or may function as a circuit board, and may include conductors (e.g., conductive traces, wires, etc.) that carry electrical signals among various components of the device (e.g., from the switch assemblies 316 to a processor or other circuitry).

As described herein, some or all of the functions of the switch assemblies 316 may be integrated into a structural web. For example, conductive fibers may be integrated with the structural web 310 to form a capacitive sensor below a keycap. As another example the structural web 310 may be formed with bottom surfaces with integral spring members formed of carbon fiber, where the spring members movably support the keycaps 314 above the substrate 318.

In some embodiments, the keyboard 102 may not include components depicted in FIG. 3A. For example, the flexible cover 311 may be omitted from the keyboard 102. In such an embodiment, the structural web 310 forms an externally facing upper surface of the keyboard 102.

Figure 3B:
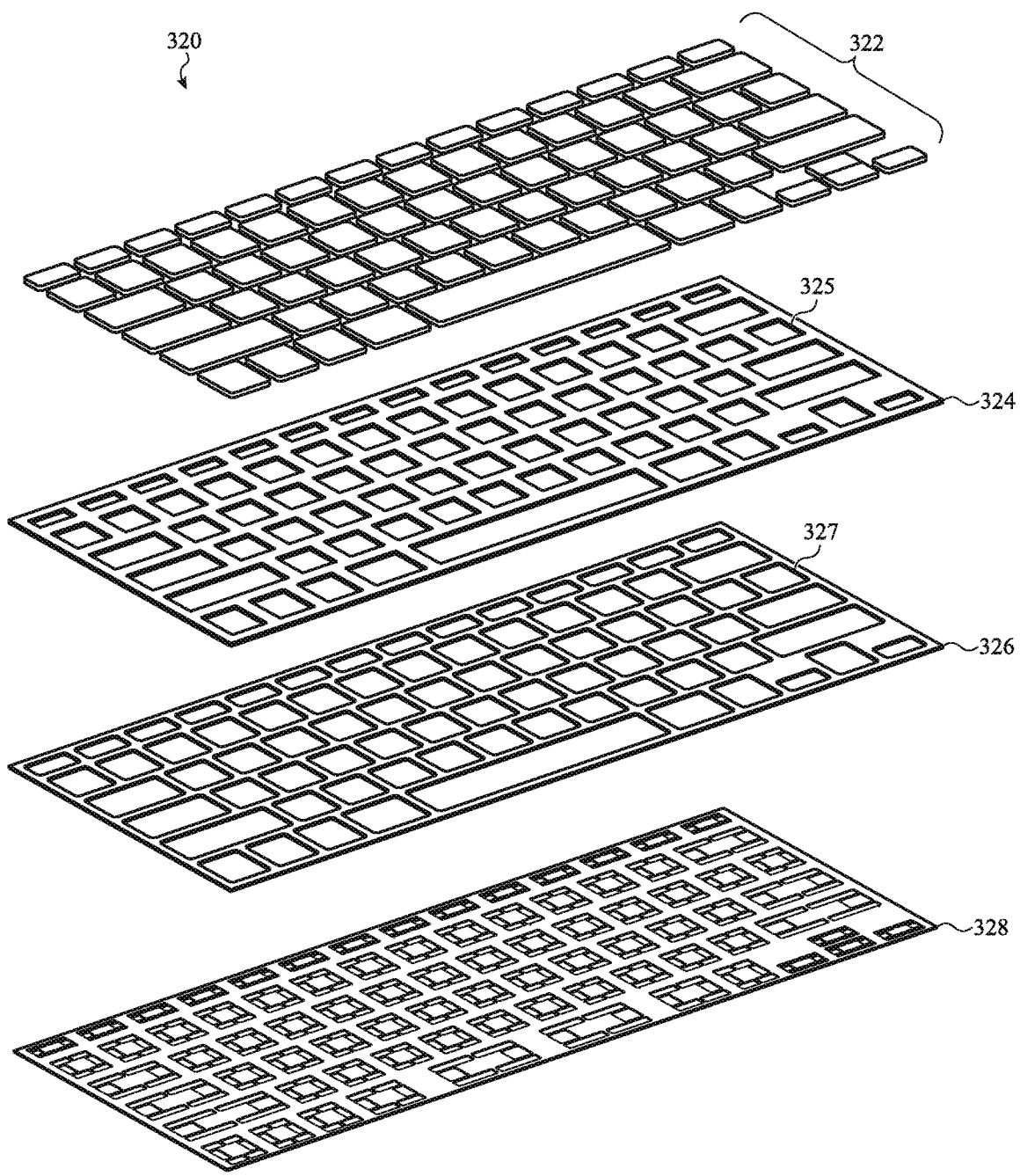
FIG. 3B is a sample exploded view of portions of a keyboard of another electronic device with a structural web.

FIG. 3B shows an exploded view of portions of another example keyboard 320 of an electronic device with a structural web. The keyboard 320 may be an embodiment of or otherwise similar to the keyboard 102 described above. The keyboard 320 may include keycaps 322, a structural web 326 (e.g., a key web), and a substrate 328. These components may be the same as or similar to the keycaps 314, structural web 310, the substrate 318, respectively, of FIG. 3A, and for brevity details of those components will not be repeated here.

The keyboard 320 also includes a structural web 326. The structural web 326 may be part of, or affixed to, a housing (e.g., the housing 104, FIG. 1), and may define a group of openings 327 configured to receive keycaps 322 therein. The structural web 326 may also include other openings (not shown) for other buttons, input mechanisms, touchpads, microphones, speakers, and/or other components or assemblies.

The keyboard 320 may also include a flexible cover 324. The flexible cover 324 may be formed of or include any suitable material, such as a textile fabric, polymer sheet, composite material, or the like. The flexible cover 324 may define openings 325, which may generally align with the openings 327 in the structural web 326. The openings 325 may be smaller than the openings 327, such that a portion of the flexible cover 324 extends into or partially encloses the top of the openings 327 in the structural web 326. Keycaps 322 may be larger than the openings 325, and may be positioned over the flexible cover 324 and optionally in contact with the flexible cover 324. As described herein, the flexible cover 324, and more particularly the portions of the flexible cover that extend over the openings 327, may act as a spring member and/or supporting structure for the keycaps 322. In some cases, the flexible cover 324 may provide sufficient support that no hinge mechanism (e.g., a scissor mechanism, a butterfly hinge) needs to be used to movably support a keycap. The flexible cover 324 may also form a seal that prevents ingress of liquid, debris, or other contaminants into the interior of a device.

In some cases, the flexible cover 324 is integrated with the structural web 326. For example, as described in greater detail with respect to FIGS. 11A-11D, the flexible cover 324 may be incorporated with the material of the structural web 326 during the manufacturing process of the structural web 326. In such cases, the structural web 326 and the flexible cover 324 may be co-cured together or otherwise integrated to form a single integrated part. In such cases, the flexible cover 324 may not be removable from the structural web 326 without destroying the structural web 326 and/or the flexible cover 324.

The keyboard 320 may also include switch assemblies, such as the switch assemblies 316 described above with respect to FIG. 3A. In such cases, the switch assemblies may be positioned below the keycaps 322 and below the flexible cover 324.

Figure 4A:
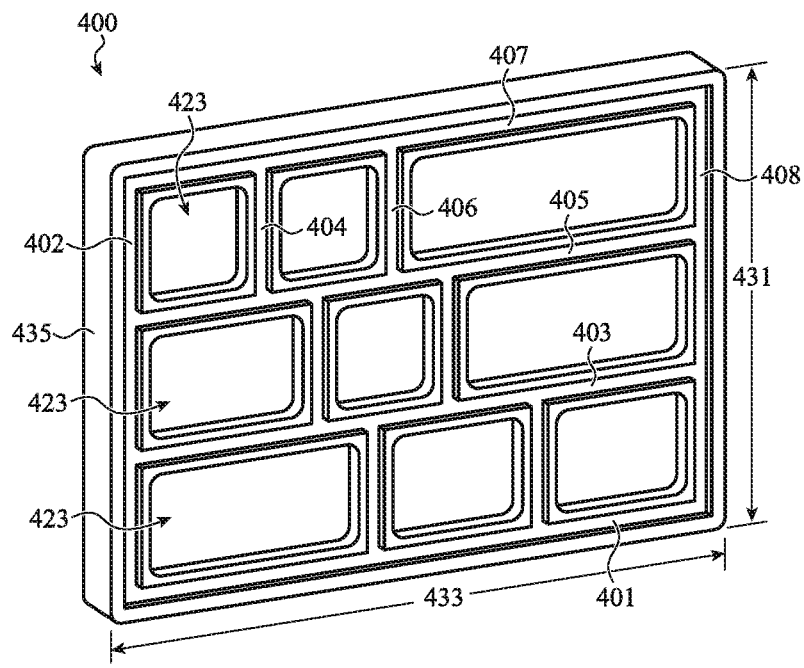
FIG. 4A illustrates a sample mold used to manufacture a structural web.
Figure 4B:
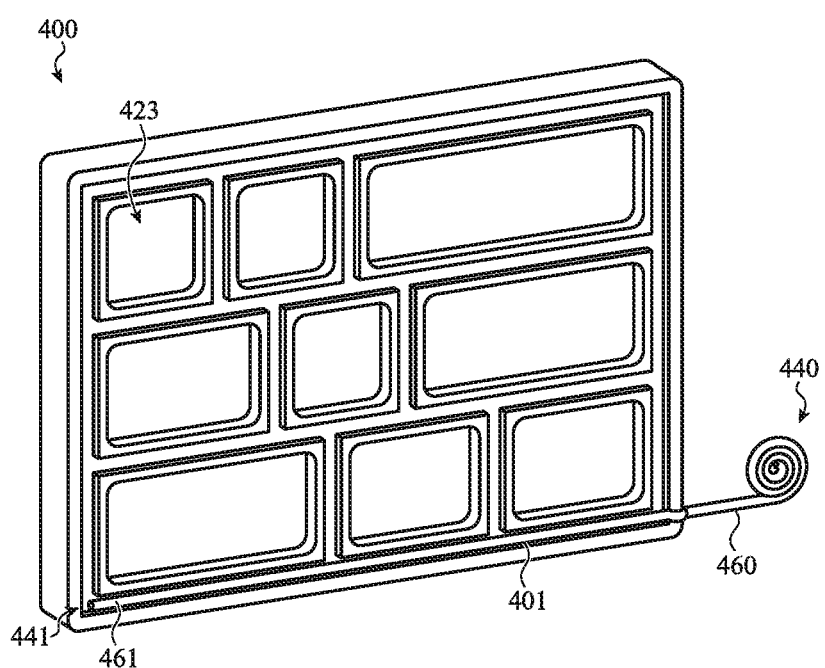
FIG. 4B illustrates the sample mold of FIG. 4A engaged with a fiber roll in a first state.
Figure 4C:
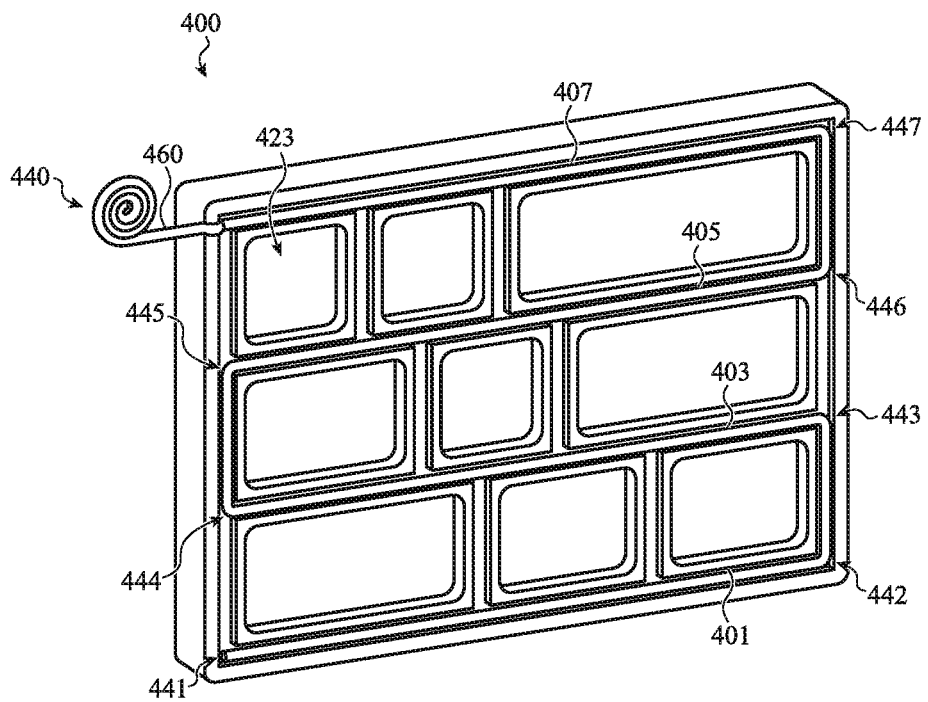
FIG. 4C illustrates the sample mold of FIG. 4A engaged with a fiber roll in a second state.
Figure 4D:
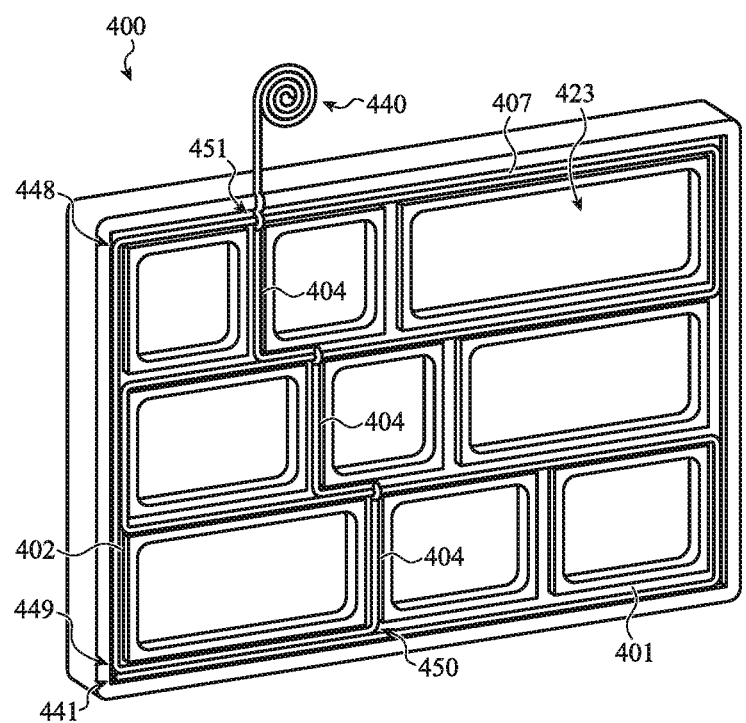
FIG. 4D illustrates the sample mold of FIG. 4A engaged with a fiber roll in a third state.
Figure 4E:
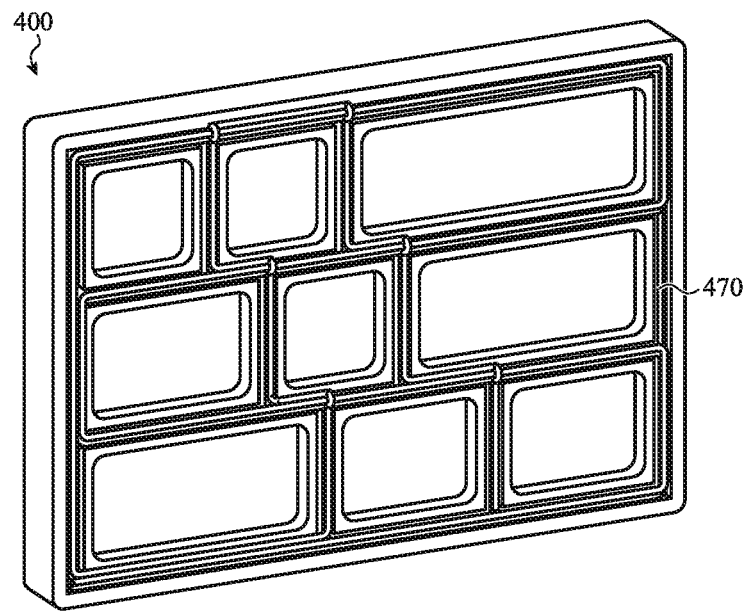
FIG. 4E illustrates the sample mold of FIG. 4A engaged with a finished fiber web.
Figure 4F:
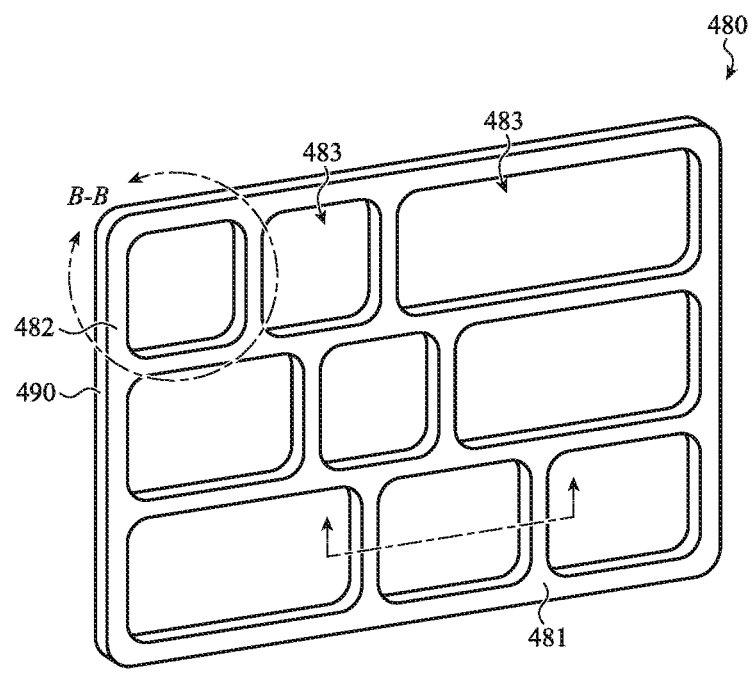
FIG. 4F illustrates a finished structural web manufactured using the sample mold of FIG. 4A.

FIGS. 4A-4F illustrate an example mold and operations for manufacturing a structural web for an electronic device, the structural web formed from a single continuous fiber material. FIG. 4A illustrates a sample mold 400 used to manufacture a structural web 480. FIGS. 4B-E illustrate example operations used to manufacture a structural web 480 using the mold 400. FIG. 4F illustrates a completed structural web 480 manufactured using the mold 400.

A structural web 480 may be formed by repeatedly layering a single continuous fiber material 460 in a keyboard web pattern defined by multiple retention channels of a mold 400. A first end 461 of the fiber is positioned in a first retention channel 401 of the mold 400. The fiber 460 is then stretched, under tension, along the remaining portion of the first retention channel 401, and subsequently routed throughout other retention channels to form the shape of the desired web. The single continuous fiber material 460 is repeatedly routed though the retention channels, forming layered walls surrounding each of the multiple apertures 423 of the mold 400, thereby mapping a keyboard web pattern. Adhesive is applied to the layered fiber web or is an existing component of the fiber (e.g., if the fiber is a pre-preg fiber as discussed above). The layered fiber web is then heated and compressed to form a structural web made of a carbon fiber reinforced polymer.

With attention to FIG. 4A, an example mold 400 is depicted with major axis 433, minor axis 431, and thickness 435. The major axis is oriented in a longitudinal, horizontal, or first direction. The minor axis is oriented in a lateral, vertical, or second direction. The mold is substantially planar.

The mold 400 includes multiple retention channels which define multiple apertures 423. The retention channels are configured to receive a portion of the fiber 460 unfurled from the fiber roll 440. The fiber 460 is layered or stacked in the retention channels to form a layered fiber web. In the mold 400 of FIGS. 4A-E, a set of four retention channels 401, 403, 405, 407 are oriented in a first or horizontal direction, each parallel with the major axis of the mold 400. A first retention channel 401 is positioned along a first edge of the mold 400. Second retention channel 403 and third retention channel 405 are positioned along an inner portion of the mold 400. And fourth retention channel 407 is located at a second edge of the mold 400.

A set of four retention channels 402, 404, 406, 408 are oriented in a second or vertical direction, each parallel with the minor axis of the mold 400. A fifth retention channel 402 is positioned along a third edge of the mold 400. Sixth retention channel 404 and seventh retention channel 406 are positioned along an inner portion of the mold 400. And eighth retention channel 408 is located at a fourth edge of the mold 400. Each of sixth retention channel 404 and seventh retention channel 406 do not follow or trace a straight line like the other retaining channels of the mold 400, but rather each change direction with a set of two 90 degree turns.

The multiple retention channels define multiple apertures 423. In the embodiment of the mold 400 of FIGS. 4A-E, the set of eight retention channels define nine apertures 423. The nine apertures 423 are not of uniform shape or size, some forming a square shape and other a rectangular shape. The varied aperture size is similar to portions of the structural web 310 of FIG. 3A (or the structural web 326 of FIG. 3B). The nine apertures 423 are configured to receive respective keycap, such that the keycap may actuate vertically within a particular aperture 423.

Each of the multiple retention channels is of a cross-sectional shape to reflect the desired cross-sectional shape of the layered fiber web and, ultimately, the structural web. For example, the retention channels may be of a rectangular cross-section, to include a squared or flat bottom and vertical edges extending 90 degrees from the bottom of the retention channel, to provide a structured web with rectangular cross-section. For example, as depicted in FIG. 4F, the finished structural web 480 includes nine apertures 483, each with rectangular edges of thickness 490.

As briefly discussed, a layered fiber web 470 is formed by repeatedly layering a single continuous fiber material 460 in a keyboard web pattern defined by multiple retention channels of a mold 400. With attention to FIG. 4B, a first end 461 of a fiber 460 is unfurled from a fiber roll 440. The fiber roll 440 contains a sufficient length of fiber 460 to repeatedly lay fiber 460 within the multiple retention channels of the mold 400. The length of fiber 460 depicted in fiber roll 440 is reduced in length for clarity purposes only.

The first end 461 of fiber 460 is attached to a first mold point 441 of a portion of the first retention channel 401 of the mold 400. The attachment of the first end 461 of fiber 460 may be to a bottom portion or lower surface of the first retention channel 401. The attachment of the first end 461 of fiber 460 may be to an end of the first retention channel 401, meaning adjacent the intersection of the first retention channel 401 and the fifth retention channel 402.

The first end 461 of fiber 460 may be attached to first mold point 441 of the first retention channel 401 of the mold 400 by any of several ways. For example, the first end 461 may be fitted with an adhesive such as a glue to attach to the first mold point 441 of the first retention channel 401. In some embodiments, the first end 461 of the fiber 460 attaches to a tow element disposed at the first mold point 441, as discussed with respect to FIGS. 5A-B. In one embodiment, the first retention channel 401 includes an integrated hook feature disposed at the first mold point 441 which may receive the first end 461 of the fiber 460. In some embodiments, the first end 461 is attached at any point within the first retention channel 401, to include a lower surface and an edge surface of the first retention channel 401.

After the first end 461 of the fiber 460 is attached to the first retention channel 401 of the mold 400 at the first mold point 441, the fiber 460 is laid along the remaining portion of the first retention channel 401 in a first direction. Stated another way, the fiber 460, from the attached first end 461, is then laid along or within the first retention channel 401 in a first or longitudinal direction parallel with the major axis 433 of the mold 400. The fiber 460 is laid from first mold point 441 to second mold point 442. The laying of the fiber 460 within the first retention channel 401 may occur while the fiber 460 is under tension. When the laying of the fiber 460 within the first retention channel 401 occurs under a tension, the fiber 460 may stretch in length.

Fiber roll 440 is configured to unfurl the fiber 460 as the fiber 460 is positioned and routed through the multiple retention channels of the mold 400. The fiber roll 440 may be a manually operated device or operated automatically, such as through an automated machine. The fiber roll 440 device may be any device that predictably and reliably unfurls the fiber 460. In some embodiments, the fiber roll 440 is configured to impart a selectable tension to the fiber 460 as the fiber 460 is unfurled. It should be appreciated that dimension of the fiber roll and fiber are exaggerated for illustrative purposes.

With attention to FIG. 4C, the fiber 460 is further unfurled from the fiber roll 440 and routed through additional retention channels of the mold 400. Generally, the fiber 460 is routed, in this embodiment, in a back and forth manner along the major axis 433 of the mold 400, working the fiber 460 from a lower edge area of the mold 400 to an upper edge area of the mold 400. The fiber 460, as depicted in FIG. 4C, is routed from the following points of the mold: first mold point 441, second mold point 442, third mold point 443, fourth mold point 444, fifth mold point 445, sixth mold point 446, seventh mold point 447, and eighth mold point 448. Note that the fiber 460 makes substantially 90 degree turns at each of the mold points. The routing of the fiber 460 along the major axis 433 and minor axis 431 directions of the mold 400 results in definition of the apertures 423.

After the laying of the fiber 460 in a first direction from the first mold point 441 along the first retention channel 401 to a second mold point 442, the fiber 460 is turned to a second direction and laid within eighth retention channel 408. The second direction is transverse to the first direction and parallel to the minor axis 431 of the mold 400. The second direction may be substantially 90 degrees to the first direction. Note that the turning of the fiber 460 by 90 degrees at second mold point 442 may include the fiber 460 pressing against a cornered channel edge formed at the intersection of first retention channel 401 and eighth retention channel 408. In some embodiments, a change in direction of the fiber 460, such as the change occurring at mold point 442, may be enabled or facilitated with a tow fixture, as described with respect to FIGS. 5A-B. The fiber 460 is routed and laid within the eighth retention channel 408 until the fiber 460 reaches third mold point 443.

The fiber 460 is then turned 90 degrees and routed and lay within the second retention channel 403 until the fiber 460 reaches fourth mold point 444. Note that the fiber 460, when laid in the second retention channel 403 from third mold point 443 to fourth mold point 444, is laid in a direction opposite to the first direction. Stated another way, the laying of the fiber 460 from third mold point 443 to fourth mold point 444 within the second retention channel 403 is performed in a direction 180 degrees from the direction of laying of the fiber 460 from first mold point 441 to second mold point 442 within the first retention channel 401.

After the laying of the fiber 460 in the second retention channel 403 to the fourth mold point 444, the fiber 460 is routed and laid in fifth retention channel 402 from fourth mold point 444 to fifth mold point 445. The direction of the fiber 460 in fifth retention channel 402 is parallel and in the same direction of the fiber 460 laying direction within eighth retention channel 408.

After the laying of the fiber 460 in the fifth retention channel 402 to the fifth mold point 445, the fiber 460 is routed and laid in third retention channel 405 from fifth mold point 445 to sixth mold point 446. The direction of the fiber 460 in the third retention channel 405 is parallel and in the same direction of the fiber 460 laying direction within first retention channel 401.

Upon reaching sixth mold point 446, the fiber 460 turns 90 degrees and is laid within eighth retention channel 408 from sixth mold point 446 to seventh mold point 447. The direction of the fiber 460 in the eighth retention channel 408 is parallel and in the same direction of the fiber 460 laying direction within both the eighth retention channel 408 and fifth retention channel 402.

Lastly, upon the fiber 460 reaching seventh mold point 447, the fiber 460 turns 90 degrees and is laid within the fourth retention channel 407 from seventh mold point 447 to eighth mold point 448. Note that the direction of the fiber 460 in the fourth retention channel 407 is parallel and in the same direction as that of the fiber 460 within the second retention channel 403 between third mold point 443 and fourth mold point 444.

It is noted that after the laying of the fiber 460 depicted in FIG. 4C, the fiber 460 has begun to define the set of nine apertures 423 of the layered fiber web 470. Also, a single continuous fiber material 460 runs across the major axis 433 length of the mold (and the layered fiber web 470) four times, one time each within the four major axis retention channels 401, 403, 405, 407. A continuous fiber material running the length of the major axis 433 will, among other things, increase the relative longitudinal strength of the formed layered fiber web 470 and, once cured, the finished structural web 480.

After completing a routing of the fiber 460 through each of the four major axis 433 lengths of the mold 400, the fiber 460 is routed and laid within the minor axis 431 lengths of the mold 400, as depicted in FIG. 4D.

With attention to FIG. 4D, the fiber 460 is depicted as routed within two of the lateral or minor axis 431 retention channels of the mold 400. Specifically, the fiber 460 is depicted routed from eighth mold point 448 to ninth mold point 449, then to tenth mold point 450, and finally to eleventh mold point 451. The fiber 460, when routed between eighth mold point 448 and ninth mold point 449 within fifth retention channel 402, defines an outer edge perimeter of the layered fiber web 470. Note that a portion of the fiber 460 routed within fifth retention channel 402, is adjacent to a portion of the fiber 460 already routed through a portion of fifth retention channel 402. Thus, the portion of fiber 460 now routed from eighth mold point 448 to ninth mold point 449 overlaps or is layered with the previously laid portion of fiber 460, thereby providing a portion of fiber 460 layered with itself. Such layering of the fiber 460 with itself will ultimately form the layered fiber web 470. Note also that ninth mold point 449 is adjacent to first mold point 441. In some embodiments, ninth mold point 449 is coincident with first mold point 441. In some embodiments, the fiber 460, at the ninth mold point 449, is layered with the portion of fiber 460 lying at first mold point 441, thereby beginning the layering of the fiber 460 upon itself.

The fiber 460, from ninth mold point 449, turns 90 degrees to lie within first retention channel 401. However, the fiber 460, unlike previous fiber routings within a given retention channel, does not run the length of the retention channel. Instead, the fiber 460, from ninth mold point 449, is laid within first retention channel 401 to tenth mold point 450 within first retention channel 401.

The portion of fiber 460 routed and laid between mold point 449 and tenth mold point 450 within first retention channel 401 overlaps or is layered with a portion of fiber 460 already existing in first retention channel 401. From tenth mold point 450, the fiber 460 turns 90 degrees and is routed and laid within sixth retention channel 404. Note that sixth retention channel 404, unlike most retention channels (for example, all major axis 433 retention channels 401, 403, 405, 407), does not form a straight path. Instead, sixth retention channel 404 includes to paired 90 degree turns, in reflection of the non-uniform configuration of the apertures 423.

After the laying of the fiber 460 depicted in FIG. 4D, a single continuous fiber material 460 runs across the minor axis 431 length of the mold twice, one time within each of the minor axis retention channels 402, 404. A continuous fiber material running the length of the minor axis 431 will, among other things, increase the relative lateral strength of the formed layered fiber web 470 and, once cured, the finished structural web 480.

It should be appreciated that the continuous fiber material 460 may be laid multiple times within a single channel or within multiple channels, in order to fill the channels and/or impart additional strength to portions of a finished product. Thus, although the continuous fiber material 460 is shown as being laid only once in a single layer in each channel, in many embodiments the continuous fiber material may be laid multiple times in each channel, and/or in a particular pattern between mold points. The continuous fiber material 460 may be laid multiple times within a channel before entering (or being laid within) another channel, thus doubling back on itself one or more times. These multiple layers within a single channel are not illustrated solely for purposes of clarity.

For example, the continuous fiber material 460 may be laid or stretched along a particular retention channel or first set of retention channels a greater number of times than along a different retention channel or second set of retention channels. More specifically, the continuous fiber material 460 may be stretched along the first retention channel 401 a first number of times and stretched along the eighth retention channel 408 a second number of times, the first number of times greater than the second number of times. Thus, the resulting completed structural web will be relatively stronger along the portion associated with the first retention channel 401 than that associated with the eighth retention channel 408 because of the increased number of continuous fibers positioned in the portion associated with the first retention channel 401.

As another example, the continuous fiber material 460 may be laid or stretched along a first set of retention channels a greater number of times than a second set of retention channels, so as to create increased strength along the direction associated with the first set of retention channels. More specifically, the continuous fiber material 460 may be stretched a first number of times along all retention channels positioned along the longitudinal or major axis 433 length of the mold 400, and stretched a second number of times along all retention channels positioned along the lateral or minor axis 431 length of the mold 400. Thus, the resulting completed structural web will be relatively stronger along the major axis 433 than the minor axis 431 because of the increased number of continuous fibers positioned along the major axis 433.

The carbon layup process described with respect to FIGS. 4A-4D describe that the layers of fiber that extend completely along the major axis (e.g., along the horizontal direction, described with respect to FIG. 4C) are added first, and then the layers that extend completely along the minor axis (e.g., along the vertical axis, described with respect to FIG. 4D) are added subsequently. However, this is merely one example layup pattern, and other patterns are also possible. For example, the fiber layering process may alternate between horizontal segments and vertical segments. More particularly, a first pass of the fiber 460 may position the fiber 460 in the first retention channel 401 (extending horizontally through the entire retention channel 401), and the next pass of the fiber may position the fiber 460 in the fifth retention channel 402 (extending vertically through the entire retention channel 402). The process may continue in this manner, with continuous strands being alternately positioned in horizontal and vertical channels, thereby minimizing or reducing the number of fiber segments that do not extend along the full length of a retention slot.

A top view of a finished layered fiber web 470, retained within mold 400, is depicted in FIG. 4E. The layered fiber web surrounds each of the multiple apertures of the layered fiber web, and forms layered walls. The layered walls encircle each aperture and form a perimeter of the layered fiber web.

The single continuous fiber material 460 is routed and layered within all eight retention channels of the mold 400. The layered fiber web 470 includes eight apertures 423, sized to receive keys, as described with respect to FIG. 3A. The single continuous fiber material 460 is routed through the retention channels so as to repeatedly dispose a length of fiber along an entire length of a retention channels so as to increase strength along an axis parallel with the particular retention channel. For example, as briefly discussed above, the single continuous fiber material 460 is routed or laid across the entire length of each of the major axis 433 retention channels to increase strength along the major axis 433. For example, multiple continuous fiber material strands along the major axis will increase the torsional or twisting strength of the completed structural web about the major axis. Also, multiple continuous fiber material strands along the major axis will increase the bending strength of the completed structural web about the major axis, and also increase the robustness of the structural web to fatigue loading (such as particularly prevalent in keyboard or keypad uses of the structural web).

A finished structural web 480 is depicted in FIG. 4F. The structural web 480 is formed from the layered fiber web 470 after application of pressure and/or heat to the layered fiber web 470. Prior to application of pressure and/or heat to the layered fiber web 470, an adhesive or binding agent is activated. The adhesive may be incorporated with the fiber. For example, the fiber 460 may be a pre-preg fiber in which adhesive already exists adjacent to the fiber 460 or embedded with the fiber 460. This configuration is discussed in more detail with respect to FIG. 8.

Alternatively, the adhesive may be applied at one or more steps of the laying of the fiber 460 discussed above. In one embodiment, the adhesive is applied after the layered fiber web 470 is completed, for example, the adhesive is applied to a top surface of the layered fiber web 470. In one embodiment, the adhesive is applied to each of the multiple retention channels of the mold 400 prior to the laying of the fiber 460 within the retention channels. Embodiments or configurations of the structural web involving the application of adhesive (e.g., non pre-preg fiber embodiments) are discussed in more detail with respect to FIG. 9.

With attention to FIG. 4F, a finished structural web 480 is depicted. The structural web 480 is formed after application of heat and or pressure to the layered fiber web 470 depicted in FIG. 4E. After the application of heat and/or pressure, the continuous fiber material 460 of the layered fiber web 470, as layered to form the walled apertures 483, forms a composite, such as a carbon fiber reinforced polymer. Stated another way, the application of heat and/or pressurization causes polymerization of the adhesive matrix with the fiber reinforcement material to form a composite material such as a carbon fiber reinforced polymer.

The structural web 480 has thickness 490. The walls surrounding each of the nine apertures 483 of the structural web 480 are of uniform thickness, and generally form a set of planar surface perpendicular to the upper and lower planar surfaces of the structural web 480. The finished structural web 480 includes nine apertures 483, sized to receive keys, as described with respect to FIG. 3A.

Figure 5A:
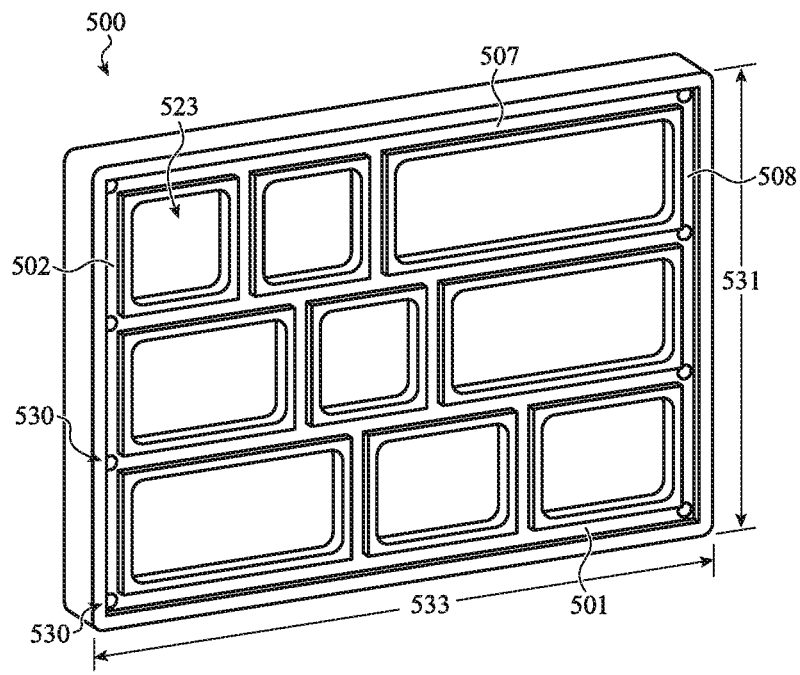
FIG. 5A illustrates another sample mold used to manufacture a structural web.
Figure 5B:
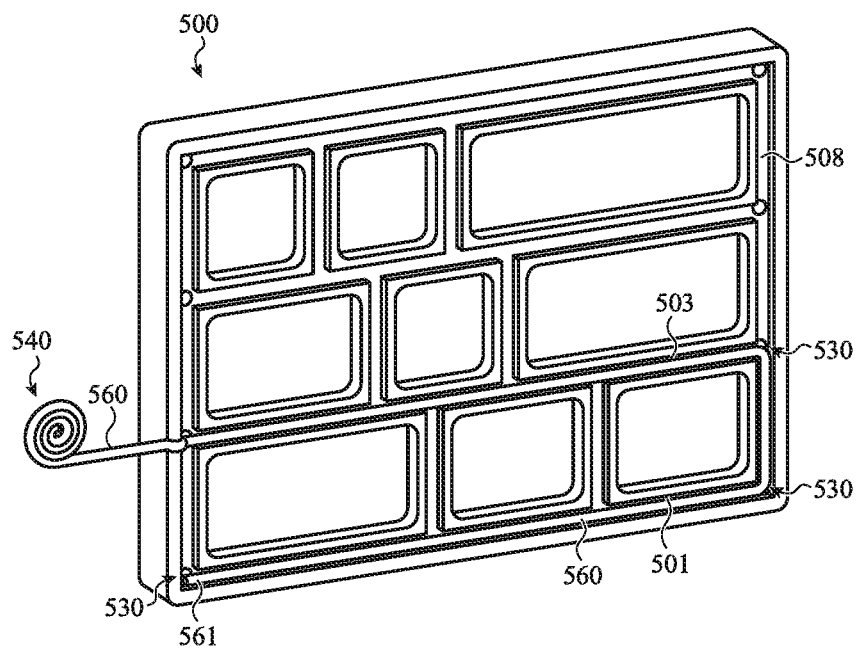
FIG. 5B illustrates the sample mold of FIG. 5A engaged with a fiber roll.

FIGS. 5A-B depict another embodiment of a mold 500 used to manufacture a structural web. The embodiment of the mold 500 is similar to the mold of FIGS. 4A-E except that multiple tow fixtures 530 are provided. The mold 500 includes a longitudinal or major axis 533 and a lateral or minor axis 531.

Generally, a tow fixture 530 may provide any of several functions or the completed structural web and/or for the manufacture of the structural web. The tow fixture may secure the end of a continuous fiber material such that the fiber may be stretched under tension and stretched across or along a remaining portion of a retention channel. A tow fixture may also be positioned at one or more locations of direction changes or turns of the fiber. For example, in one embodiment, a tow fixture 530 is positioned within a retention channel of the mold 500, the tow fixture 530 configured to receive a portion, to include an end portion, of the continuous fiber material 560. A tow fixture 530 may be located at the intersection of an end of a first retention channel positioned along the major axis 533 of a mold 500 and a second retention channel positioned along a minor axis 531 of the mold 500. The tow fixture may allow varied tension to be applied to the fiber. For example, a first tension between a first pair of tow fixtures, and a second tension between a second pair of tow fixtures.

The tow fixture 530 may be embedded to a wall of a retention channel of the mold 500. The tow fixture 530 may be configured to allow a portion of the fiber 560 to wrap or encircle the tow fixture 530. The tow fixture 530 may allow a change in direction of the fiber without the fiber pressing against an inside wall of the retention channel. In some embodiments, the fiber 560 may encircle the tow fixture 530 multiple times. Stated another way, the fiber 560 may wrap around a particular tow fixture 530 multiple times.

The tow fixture 530 may be formed or configured such that the tow fixture 530 remains with the mold 500 after completion of the structural web. Stated another way, after the layered fiber web is formed and after heat and/or pressure is applied to the layered fiber web, the tow fixture does not become a part of the resulting structural web, but instead remains with the mold 500.

In one embodiment, the tow fixture 530 may be made of the same material as the mold 500. In one embodiment, the tow fixture 530 may be made of a different material as the mold 500, the material of the tow fixture 530 providing alternative material properties to portions of the finished structural web. For example, tow fixtures 530 positioned at corners of the structural web may be made of a softer (or less brittle) material than the structural web so as to withstand greater impact loading (due to, for example, dropping of a keyboard of which the structural web is a component; see FIGS. 3A, 3B).

In some embodiments, the tow fixture 530 is configured to attach to the layered fiber web such that, after heat and/or pressure is applied to the layered fiber web, the tow fixture 530 remains with the resulting structural web, and detaches from the mold 500. In some embodiments, multiple tow fixtures 530 are used in the manufacture of the structural web, the multiple tow fixtures 530 having varied characteristics such as varied material properties, shapes, sizes, and the like.

In the embodiment of FIG. 5A, a set of eight tow fixtures 530 are positioned at each of the four corners of the mold 500, and also at each of four turn points along the minor axis 531 of the mold 500. The configuration of the mold 500 and tow fixtures 530 facilitates routing or lying of multiple portions of a continuous fiber material along the major axis 533 of the mold 500.

FIG. 5B depicts a continuous fiber material 560 routed or laid through three retention channels of the mold 500. A first end 561 of fiber 560 is attached to a tow fixture 530 disposed at an end of the first retention channel 501. The fiber 560 is unfurled from fiber roll 540. The fiber 560 extends from the attached position of first end 561 to the opposite end of the first retention channel 501 parallel with the major axis 533 of the mold 500, wherein the fiber engages a second tow fixture 530. The fiber 560 then turns 90 degrees in a direction parallel with the minor axis 531 of the mold 500, wherein the fiber 560 engages a third tow fixture 530. The fiber turns again 90 degrees in a direction parallel to the major axis 533 of the mold 500, to engage a fourth tow fixture 530.

The routing and laying of the fiber 560 then proceeds in a similar manner to that described above with respect to FIGS. 4B-E to form a layered fiber web. Upon completion of a layered fiber web, pressure and/or heat would be applied to the layered fiber web as discussed previously (and also below with respect to FIGS. 8 and 9), to form a structured web.

Figure 6:
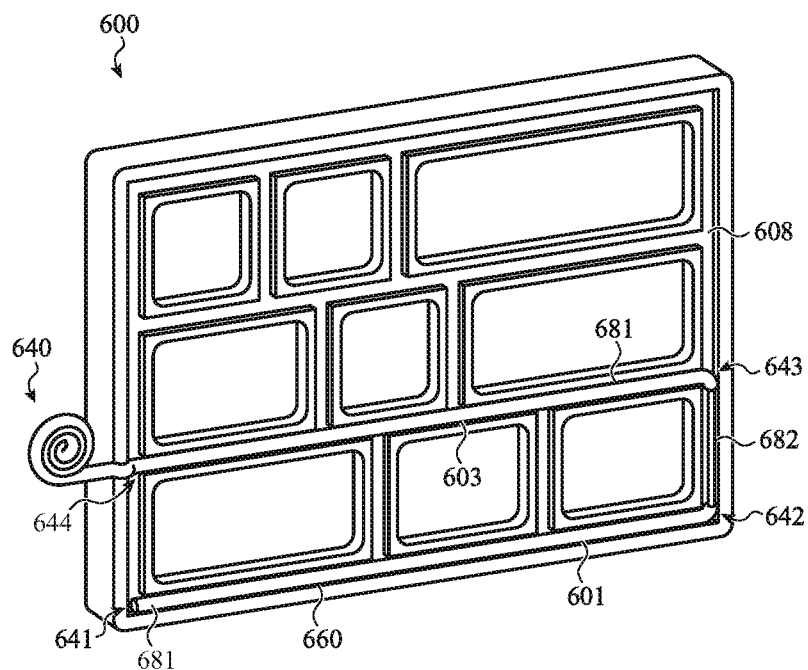
FIG. 6 illustrates another sample mold engaged with a fiber roll.

FIG. 6 depicts another embodiment of a mold 600 used to manufacture a structural web. The embodiment of the mold 600 is similar to the mold of FIGS. 4A-E except that a continuous fiber material 660 with of non-uniform diameter is used to form a layered fiber web. The mold 600 includes a longitudinal or major axis 613 and a lateral or minor axis 611. A fiber with non-uniform diameter allows a different density of fiber to be positioned in different areas of a fiber web without the requirement to layer the fiber to increase density.

The fiber 660 has a first diameter 681 and a second diameter 682. The first diameter 681 is larger than the second diameter 682. An end of the fiber 660 is attached to first mold point 641. First mold point 641 is positioned within first channel 601. The fiber 660 is then laid or routed along the remaining portion of first retainer channel 601 until reaching second mold point 642. The fiber 660 is unfurled from fiber roll 640.

The fiber 660 is configured such that the length or portion of fiber 660 that is disposed or laid within first retention channel 601 is of first diameter 681. If the fiber 660 is placed in tension and thus stretched when extending through the first retention channel 601, the length of fiber 660 when upstretched would be less than the length of the first retention channel 601.

After reaching the second mold point 642, the fiber 660 is turned 90 degrees to lie within second retention channel 608 from second mold point 642 to third mold point 643. The fiber 660 is configured such that the length or portion of fiber 660 that is disposed or laid within second retention channel 608 is of second diameter 682. Similar to the first portion of fiber 660 laying in first retention channel 601, if the fiber 660 is positioned in second retention channel 608 under tension and thus the fiber 660 is stretched, the length of the unstretched fiber 660 would be less than the length of the second retention channel between second mold point 642 and third mold point 643.

After reaching the third mold point 643, the fiber 660 is again turned 90 degrees to lie within third retention channel 603 from third mold point 643 to fourth mold point 644. The fiber 660 is configured such that the length or portion of fiber 660 that is disposed or laid within third retention channel 603 is of first diameter 681. Similar to the first and second portions of fiber 660 laying in first retention channel 601 and second retention channel 608, respectively, if the fiber 660 is positioned in third retention channel 603 under tension, the length of the unstretched fiber 660 would be less than the length of the third retention channel 603 between third mold point 643 and fourth mold point 644.

Thus, the fiber 660 fiber may have a first (and larger) diameter for a first length that corresponds to the length of a first retention channel along a major axis of a structural web, and a second (and smaller or lesser diameter to the first length) diameter for a second length that corresponds to a length of a second channel along a minor axis of a structural web. The fiber positioned in the first retention channel will provide a relatively increased density of fiber to that provided in the second retention channel. The use of a fiber 660 with non-uniform diameter allows a different density of fiber to be positioned in different areas of a fiber web without the requirement to layer the fiber to increase density.

A processor may assist in determining the relative diameters of fiber as a function of routing or lying of the fiber through the multiple retention channels of a particular mold. The calculation of the lying or routing of a fiber through retention channels of a mold will be discussed in more detail with respect to FIGS. 8-9 below.

Figure 7:
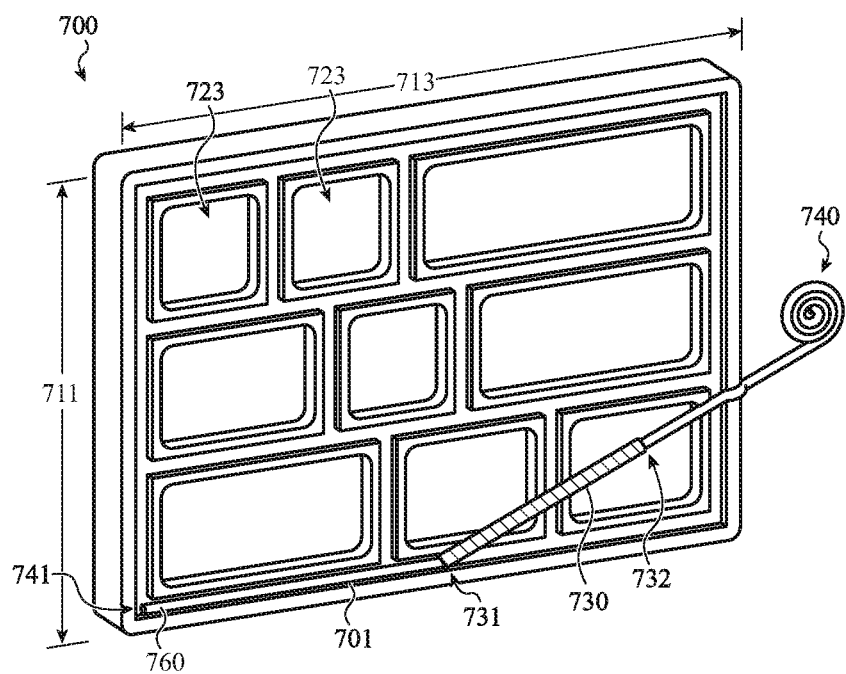
FIG. 7 illustrates another sample mold engaged with a fiber positioning tool.

FIG. 7 depicts another embodiment of a mold 700 used to manufacture a structural web. The embodiment of the mold 700 is similar to the mold of FIGS. 4A-E except that a tool 730 is used in cooperation with the fiber 760 to form a layered fiber web. The mold 700 includes a longitudinal or major axis 713 and a lateral or minor axis 711. The tool 730 may be manually positioned and/or maneuvered, or may be automatically positioned and/or maneuvered.

The tool 730 may be used for any of several purposes. The tool 730 may be used to position the fiber 760 within the multiple retention channels of the mold. For example, the positioning tool may position the fiber 760 within a first retention channel 701 of a mold 700, as depicted in FIG. 7. The tool 730 may be fitted between the fiber roll 740 and the working portion of the fiber 760, meaning the portion of the fiber 760 being positioned in a retaining channel.

The tool 730 may also aid in securing or attaching a portion, to include an end portion, of the fiber 760 to one or more tow fixtures (not shown) that may be included in the mold 700. (See FIGS. 5A-B for more discussion of tow fixtures.)

The tool 730 may also be configured to dispense an adhesive, such as a glue, to or on the fiber 760 before the fiber 760 is positioned in a retention channel. For example, the fiber 760 furled in fiber roll 740 may be fiber without any adhesive. However, as the fiber 760 passes through the tool 730, an adhesive may be applied to the fiber 760, such that, upon placement in a retention channel, the fiber 760 is coupled to an adhesive. The adhesive may simply ensure that the fiber 760 remains in the retention channel in the placed position, and/or may provide an adhesion so as to couple a placed portion of the fiber 760 to a later portion of fiber 760 positioned over or adjacent the placed fiber 760 portion.

The tool 730 may aid in providing a selectable tension to the fiber 760 as the fiber 760 is positioned within a retention channel. Also, as layers of fiber 760 are positioned within the retention channels of the mold 700, the tool 730 may serve to compress previously placed fiber 760 portions to prepare for a next layer of fiber 760 portions.

In one embodiment the tool 730 is automatically positioned and/or maneuvered by an automated positioning tool, such as a computer numeric control (CNC) machine. An automated positioning tool allows lying of the continuous fiber 760 through computer control. Furthermore, an automated positioning tool 730 allows precision application of tension to the fiber in addition to precision positioning. Stated another way, an automated positioning tool 730 such as a CNC machine allows a uniform tension to be applied to a single continuous fiber 760. Also, an automated positioning tool may be programmed to route the continuous fiber 760 through multiple channels of a mold 700, the multiple channels defining multiple apertures 723 of a pattern that defines a keyboard structural web.

Figure 8:
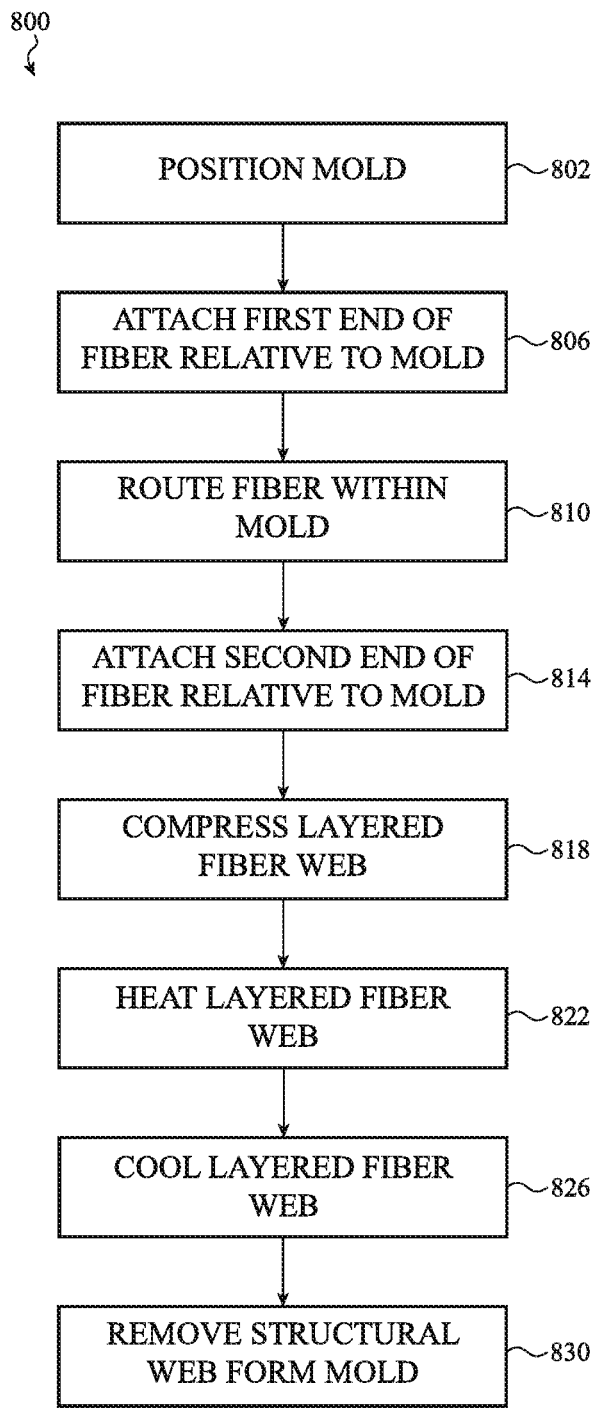
FIG. 8 is a flow chart that describes a method of manufacturing a structural web.

FIG. 8 is a flow chart that describes a method 800 of manufacturing a structural web. The method 800 is similar to the method described above with respect to FIGS. 4-7, and in particular to FIGS. 4A-F in which a fiber is routed repeatedly stretched through multiple retention channels of a mold to produce a layered fiber web, the layered fiber web subjected to pressure and/or heat to form a structured web, such as the structured web 480 of FIG. 4F. The method 800 is described with respect to previous FIGS. 4-7. The method 800 assumes the fiber is a pre-preg fiber.

The method 800 begins at step 802 where a mold is positioned. The mold is positioned in a secure posture such that a continuous fiber material, such as a carbon fiber, may be precisely and repeatedly positioned within retention channels of the mold. The fiber may be positioned within the retention channels under one or more levels of tension. A fiber positioned under tension may stretch, meaning that the fiber will lengthen.

At step 806, a first end of the fiber, as unfurled from a fiber roll, is attached or fixedly secured to a portion of a retention channel of the mold. The first end of the fiber roll may be attached to a tow fixture of the mold, as discussed, for example, with respect to FIGS. 5A-B above.

At step 810, the fiber, as attached at a first fiber end to a portion of a retention channel of the mold, is positioned within the retention channels of the mold. For example, the fiber is stretched to route through the multiple retention channels, as described with respect to FIGS. 4B-D. The routing of the fiber through the retention channels will determine the material properties of the finished structural web. Generally, for example, the strength of a given portion of a finished structural web will increase with additional layering of the continuous fiber material through the corresponding retention channel of the mold.

The routing, and thus the layering, of the continuous fiber material through the retention channels of the mold may be determined by a processor. The processor may consider any of several parameters, calculations, and/or analyses to determine the routing of the continuous fiber material. For example, a structural analysis (e.g., a finite element analysis) may determine that a particular aperture of a keyboard (e.g., the aperture receiving the space key of a keyboard), will undergo heightened fatigue loading, and thus suggest an increased strength around that particular aperture. The processor may then cause additional fibers to be routed to encircle the aperture designated to receive the space key so as to provided increased strength. Alternatively, as discussed with respect to FIG. 6, a thicker diameter fiber portion may be used to encircle the targeted aperture, so as to increase the relative strength of the targeted aperture.

The routing of the fiber through the retention channels of the mold may be performed with aid of a tool, as discussed with respect to FIG. 7. The tool may be automated, and may be driven at least partially by a processor.

After the fiber is routed through the retention channels of the mold in step 810, a final or second end of the fiber is attached to the mold at step 814, and the fiber cut from the fiber roll. The second end may be attached or secured to a tow fixture, as discussed, for example, with respect to FIGS. 5A-B above. At the completion of step 814, a layered fiber web has been formed.

After the second or final end of the fiber is attached and the fiber cut from the fiber roll, at step 818 the layered fiber web is subjected to compression (e.g., pressure is applied to the layered fiber). As previously mentioned, method 800 is applicable when the fiber is a pre-preg fiber. Thus, upon application of pressure at step 818, and/or the application of increased temperature at step 820, the pre-preg fiber undergoes polymerization. As a result of the application of pressure at step 818 and/or heat at step 822, the layered fiber web undergoes polymerization of the adhesive matrix (of the pre-preg) with the layered continuous fiber material to form a composite material such as a carbon fiber reinforced polymer. At the completion of step 826, a structured web is formed.

At step 826 the structured web is cooled so as to form a rigid and stable material. At step 830 the completed structured web is removed from the mold.

Figure 9:
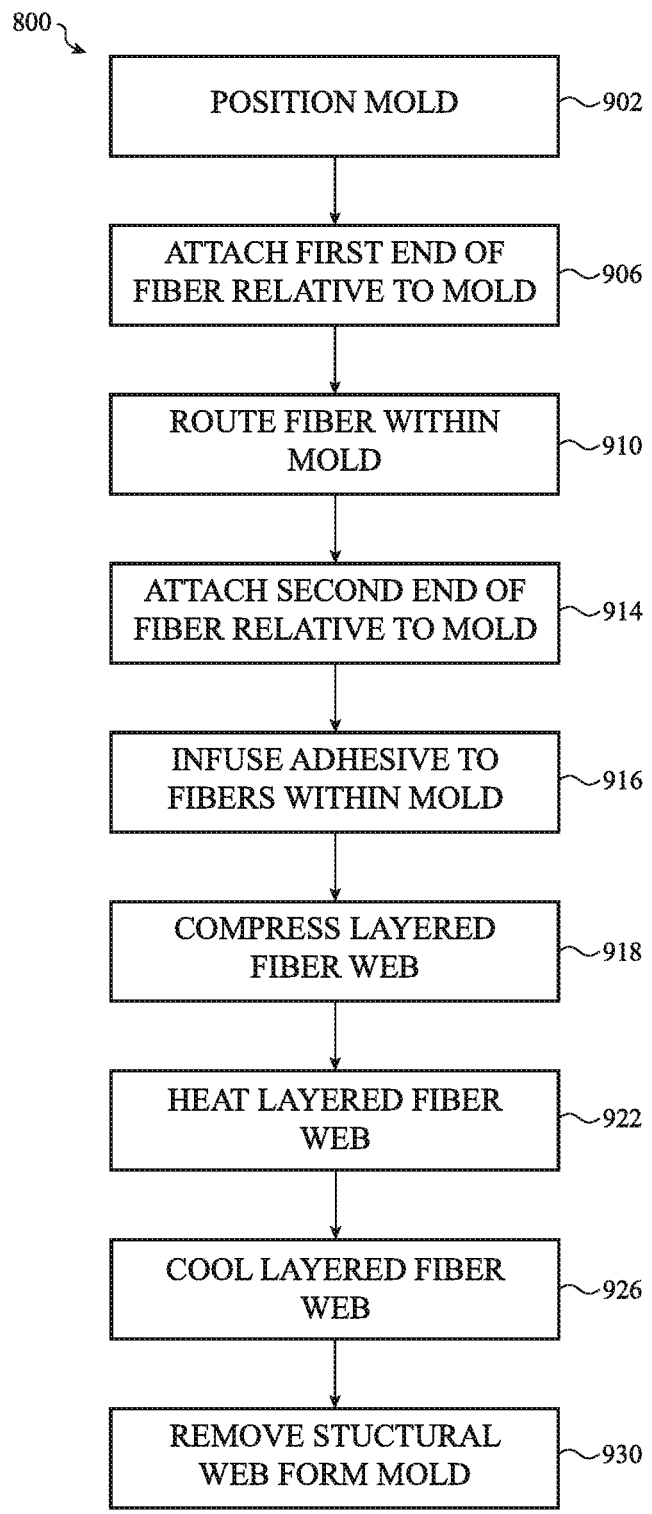
FIG. 9 is a flow chart that describes another method of manufacturing a structural web.

The pressurization and/or heating steps of steps 818 and 822, respectively, may be performed in any of several ways. For example, the pressurization and/heating may be performed using techniques involving an autoclave, vacuum bagging, and so on. Further, the heating and pressurization operations may occur at the same time or at separate times. As one example, the heating operation may occur prior to the pressurization operation FIG. 9 is a flow chart that describes a method 900 of manufacturing a structural web. The method 900 is similar to the method 800 described above, but the method assumes that the fiber is solely fiber and specifically is not a pre-preg fiber. Stated another way, the method 900 assumes that the fiber is not provided with any adhesive or binding matrix as dispensed from a fiber roll.

The method 900 begins at step 902 where a mold is positioned. The mold is positioned in a secure posture such that a continuous fiber material, such as a carbon fiber, may be precisely and repeatedly positioned within retention channels of the mold. Adhesive may be applied to a portion of the retention channels of the mold, such as along the edges of the retention channels and/or along a bottom surface of the retention channels.

At step 906, a first end of the fiber, as unfurled from a fiber roll, is attached or fixedly secured to a portion of a retention channel of the mold. The first end of the fiber roll may be attached to a tow fixture of the mold, as discussed, for example, with respect to FIGS. 5A-B above.

At step 910, the fiber, as attached at a first fiber end to a portion of a retention channel of the mold, is positioned within the retention channels of the mold. For example, the fiber is stretched to route through the multiple retention channels, as described with respect to FIGS. 4B-D. The routing, and thus the layering, of the continuous fiber material through the retention channels of the mold may be determined by a processor.

The routing of the fiber through the retention channels of the mold may be performed with aid of a tool, as discussed with respect to FIG. 7. The tool may be automated, and may be driven at least partially by a processor. In one embodiment, the tool may provide an adhesive to the fiber as the fiber is unfurled from the fiber roll.

After the fiber is routed through the retention channels of the mold in step 910, a final or second end of the fiber is attached to the mold at step 914, and the fiber cut from the fiber roll. The second end may be attached or secured to a tow fixture, as discussed, for example, with respect to FIGS. 5A-B above. Adhesive may be applied to an upper portion of the layer of fiber disposed in the retention channels at step 916. At the completion of step 910, a layered fiber web has been formed.

At step 918 the layered fiber web is subjected to compression. Upon application of pressure at step 918, and/or the application of increased temperature at step 920, the adhesive, as applied in any or all of the above steps to the fiber and/or the layers of fiber, undergoes polymerization. As a result of the application of pressure at step 918 and/or heat at step 922, the layered fiber web undergoes polymerization of the adhesive matrix (of the pre-preg) with the layered continuous fiber material (of the layered fiber web) to form a composite material such as a carbon fiber reinforced polymer. At the completion of step 922, a structured web is formed.

At step 926 the structured web is cooled so as to form a rigid and stable material. At step 930 the completed structured web is removed from the mold.

A structural web formed in accordance with the foregoing techniques may be secured to other components within an electronic device housing (and/or the housing itself) in order to increase the strength, stiffness, or other structural property of the device. Due to the material of the structural web and the manner in which the structural web is formed, various techniques may be used to secure the structural web to another component of a device. FIGS. 10A-10D illustrate various example techniques for securing a structural web to a substrate. The structural webs and substrates in FIGS. 10A-10D may be embodiments of any of the structural webs and substrates described herein, and while details of those components may not be repeated here for brevity, it will be understood that properties, characteristics, materials, functions, and the like of those components apply equally to the embodiments shown in FIGS. 10A-10D.

Figure 10A:
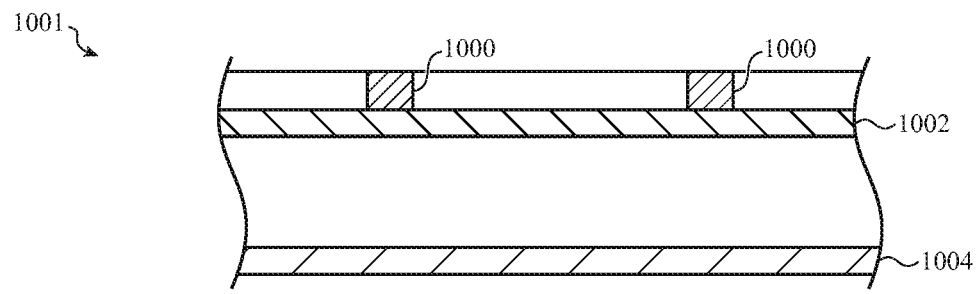
FIG. 10A is a partial cross-sectional view of a portion of an example electronic device with a structural web.

FIG. 10A illustrates a partial cross-sectional view of an example electronic device 1001, which may be an embodiment of the device 100, FIG. 1. The cross-sectional view shown in FIG. 10A may correspond generally to a view along line A-A in FIG. 1 (or a similarly positioned line through a different device), though some components shown in FIG. 1 may be omitted for clarity. As shown in FIG. 10A, a structural web 1000 may be secured to a substrate 1002 (which may correspond to a substrate 318, 328). The portions of the structural web 1000 shown may correspond to the ribs that define an opening 1003 in which a keycap and/or other components of a switch assembly may be positioned. The substrate 1002 and the structural web 1000 may be positioned above and coupled to a housing component 1004, which may define an exterior wall of the housing (e.g., the bottom wall of a base portion of a laptop computer).

As shown in FIG. 10A, the structural web 1000 and the substrate 1002 are co-cured to define a single integrated component. For example, the structural web 1000 and the substrate 1002 may be formed separately, optionally partially cured, and then, prior to fully curing, placed in contact with one another. After being placed in contact, they may be cured together such that the matrix materials of the structural web 1000 and the substrate 1002 may adhere, fuse, intermingle, or otherwise bond together to form a unitary matrix structure. As another example, the structural web 1000 and the substrate 1002 may be formed as a single component. For example, a continuous carbon fiber may be used to form both the substrate 1002 and the structural web 1000 (using the same or similar forming techniques described above), and the matrix material may encapsulate both the web portion and the substrate portion.

In some cases, the substrate 1002 and the structural web 1000 may be formed from different materials. For example, the structural web 1000 may be formed of a carbon fiber composite, and the substrate 1002 may be formed from or include a metal (e.g., aluminum, stainless steel, titanium, etc.). In order to establish a secure coupling between the structural web 1000 and a metal substrate 1002, the metal substrate 1002 may have engagement features such as clips, posts, pins, holes, or the like, and the carbon fiber of the structural web 1000 may be intertwined or otherwise engaged with the engagement features of the substrate 1002. The matrix material may then be applied and cured such that the rigid structural web 1000 is interlocked with the metal substrate 1002. A mold may be positioned on the metal substrate 1002 before or after the carbon fiber is engaged with the engagement features to help position the carbon fiber and the matrix material in the appropriate locations to define the shape of the structural web 1000.

Figure 10B:
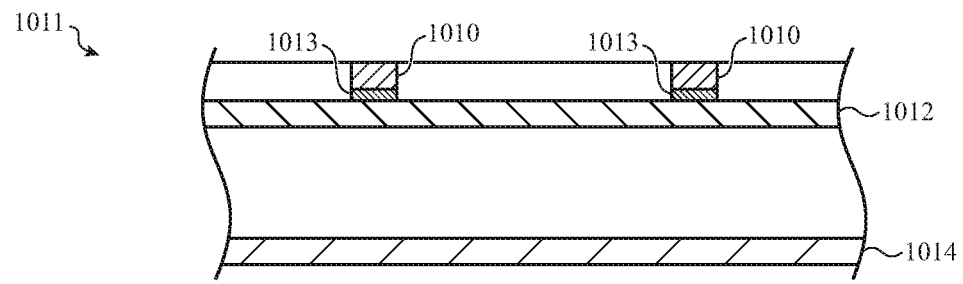
FIG. 10B is a partial cross-sectional view of a portion of an example electronic device with a structural web.

FIG. 10B illustrates a partial cross-sectional view of an example electronic device 1011, which may be an embodiment of the device 100, FIG. 1. The cross-sectional view shown in FIG. 10B may correspond generally to a view along line A-A in FIG. 1 (or a similarly positioned line through a different device).

As shown in FIG. 10B, a structural web 1010 may be secured to a substrate 1012 using an adhesive 1013. The structural web 1010 and the substrate 1012 may be positioned above and coupled to a housing component 1014, which may define an exterior wall of the housing (e.g., the bottom wall of a base portion of a laptop computer). The adhesive 1013 may be any suitable adhesive, such as a pressure sensitive adhesive, heat sensitive adhesive, epoxy, cyanoacrylate, or the like. The adhesive 1013 may be positioned between the structural web 1010 and the substrate 1012 after the structural web 1010 and the substrate 1012 are formed and cured, or it may be positioned between the structural web 1010 and the substrate 1012 before they are cured, and it may be co-cured with the structural web 1010 and the substrate 1012.

Figure 10C:
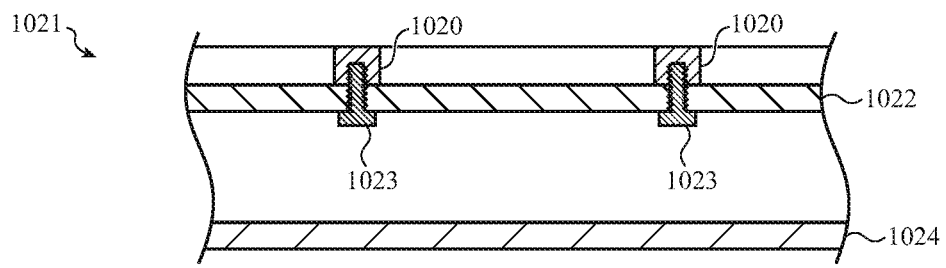
FIG. 10C is a partial cross-sectional view of a portion of an example electronic device with a structural web.

FIG. 10C illustrates a partial cross-sectional view of an example electronic device 1021, which may be an embodiment of the device 100, FIG. 1. The cross-sectional view shown in FIG. 10C may correspond generally to a view along line A-A in FIG. 1 (or a similarly positioned line through a different device).

As shown in FIG. 10C, a structural web 1020 may be secured to a substrate 1022 using fasteners 1023. The structural web 1020 and the substrate 1022 may be positioned above and coupled to a housing component 1024, which may define an exterior wall of the housing (e.g., the bottom wall of a base portion of a laptop computer). The fasteners 1023 may be threaded fasteners such as screws or bolts, or other types of fasteners such as rivets. The structural web 1020 may define openings 1025 that receive the fasteners 1023 and optionally include threads that engage with the threads of the fasteners 1023. The openings 1025 may be formed in the structural web 1020 during the molding and/or layup process described above. For example, a mold in which a structural web 1020 is formed may include protruding features that extend into a mold cavity to define the openings 1025. When a carbon fiber is layered in the mold cavity, the fiber and matrix material may surround or otherwise accommodate the protrusions such that when the matrix material is cured the openings 1025 are defined in the structural web 1020 without the carbon fiber being broken or severed due to a drilling, tapping, and/or machining operation.

Figure 10D:
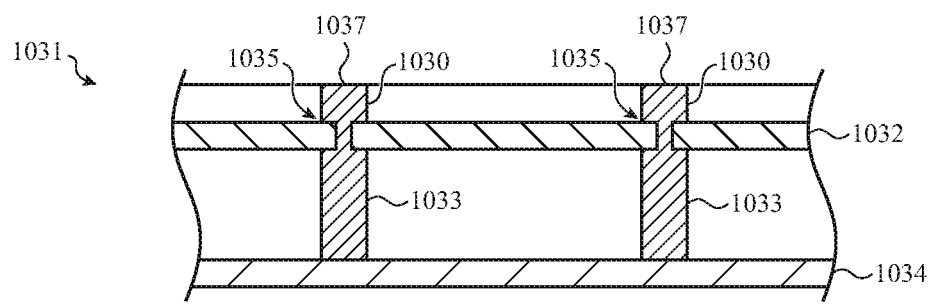
FIG. 10D is a partial cross-sectional view of a portion of an example electronic device with a structural web.

FIG. 10D illustrates a partial cross-sectional view of an example electronic device 1031, which may be an embodiment of the device 100, FIG. 1. The cross-sectional view shown in FIG. 10D may correspond generally to a view along line A-A in FIG. 1 (or a similarly positioned line through a different device).

As shown in FIG. 10D, a structural web 1030 may be secured to a substrate 1032 via an interlock between in the structural web 1030 and/or the substrate 1032. The structural web 1030 and the substrate 1032 may be positioned above and coupled to a housing component 1034, which may define an exterior wall of the housing (e.g., the bottom wall of a base portion of a laptop computer). The structural web 1030 may define support segments 1033 that extend below the substrate 1032 and contact (and are optionally secured to) the housing component 1034. The contact between the housing component 1034 and the support segments 1033 of the structural web 1030 may improve the structural rigidity, stiffness, strength, or the like of the device 1031. For example, the additional structural integration of the structural web 1030, the substrate 1032, and the housing component 1034 may reduce the likelihood of these components shearing or sliding relative to one another, which may in turn increase the bending stiffness or other structural property of the device 1031.

As shown, the structural web 1030 defines recesses 1035 that receive portions of the substrate 1032. The structural web 1030 and the substrate 1032 may be assembled together during the process of forming the structural web 1030. For example, the carbon fiber for the support segments 1033 may be positioned in a mold, after which the substrate 1032 may be positioned on top of the support segments 1033, after which web portions 1037 of the structural web 1030 may be formed (e.g., using the same continuous fiber that was used to form the support segments 1033). The support segments 1033 and the web portions 1037 may together define the recesses 1035 in the structural web 1030. The matrix material of the structural web 1030 may then be cured to form a rigid assembly. In some cases, the substrate 1032 is at least partially cured during the curing of the matrix material of the structural web 1030, thus resulting in an at least partially unitary matrix between the structural web 1030 and the substrate 1032.

Figure 11A:
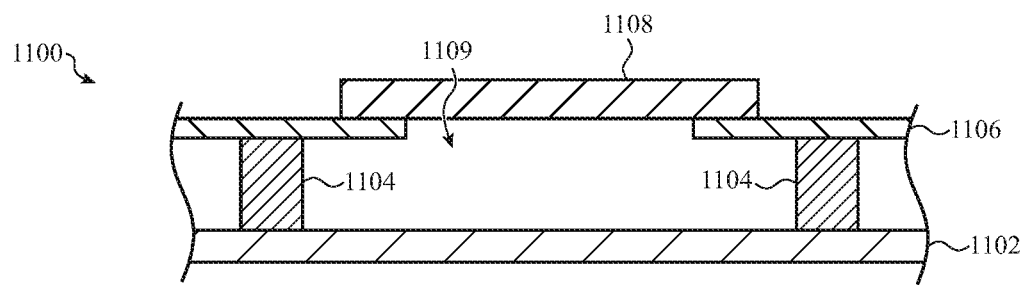
FIG. 11A is a partial cross-sectional view of an example electronic device with a structural web.
Figure 11B:
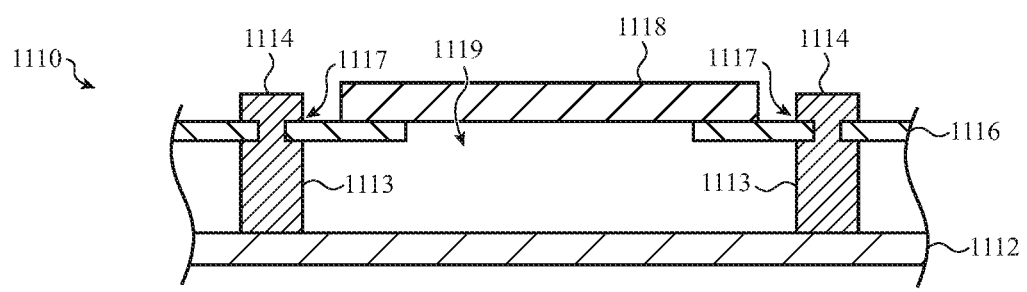
FIG. 11B is a partial cross-sectional view of an example electronic device with a structural web.
Figure 11C:
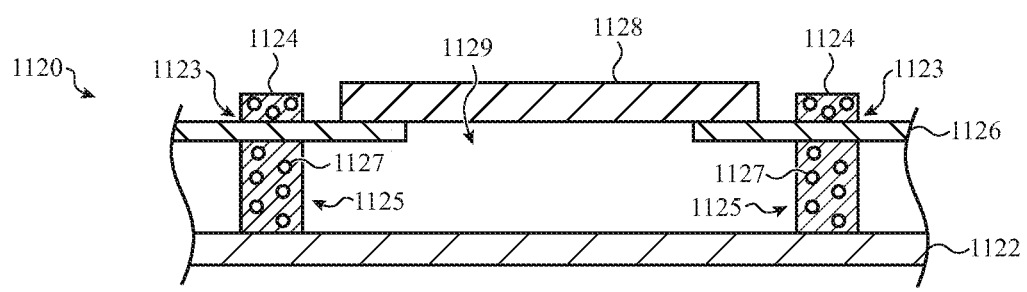
FIG. 11C is a partial cross-sectional view of an example electronic device with a structural web.

FIGS. 11A-11C depict partial cross-sectional views of various example devices that include flexible covers positioned over and/or integrated with a structural web. These devices may generally correspond to the keyboard configuration shown in FIG. 3B in which a flexible cover defines openings that correspond to and/or are aligned with the keycap openings in a structural web. Flexible covers may be flexible sheets, layers, or membranes, and may be formed of or include plastic, fabric, or the like. Where the flexible cover is a fabric cover, the fabric may be organic materials, synthetic materials, woven materials, knit materials, composite materials, coated fabrics, sealed fabrics, watertight fabrics, multi-layer fabrics, or the like.

FIG. 11A illustrates a partial cross-sectional view of an example electronic device 1100, which may be an embodiment of the device 100, FIG. 1. The cross-sectional view shown in FIG. 11A may correspond generally to a view along line A-A in FIG. 1 (or a similarly positioned line through a different device).

The device 1100 includes a substrate 1102 (which may be an embodiment of the substrate 328, FIG. 3B, or any other substrate or keyboard feature plate described herein), a structural web 1104 (which may be an embodiment of the structural web 310, FIG. 3B), a flexible cover 1106 (which may be an embodiment of the flexible cover 324, FIG. 3B), and a keycap 1108. The device 1100 may define a space 1109 below the keycap 1108 in which a switch assembly may be positioned. The switch assembly may include components that facilitate mechanical and electrical operations of the keyboard.

FIG. 11A illustrates a device 1100 in which the flexible cover 1106 is overlaid on the structural web 1104. The flexible cover 1106 may be adhered to the structural web 1104 with an adhesive or other bonding agent. In some cases, the flexible cover 1106 is co-cured with the structural web 1104 such that a matrix or resin material of the flexible cover 1106 and a matrix material of the structural web 1104 form a unitary structure, thus securing the flexible cover 1106 and the structural web 1104 together.

The keycap 1108 may be attached to the flexible cover 1106 (e.g., with adhesive), or it may simply be positioned on or above the flexible cover 1106. The flexible cover 1106 may be sufficiently flexible to allow the keycap 1108 to move downward when a user presses on the keycap 1108 to provide an input to the keyboard. The flexible cover 1106 may function as a seal or guard to prevent or inhibit the ingress of dust, dirt, liquid, or other debris or contaminants into the space 1109. The areas of the flexible cover 1106 between adjacent keycaps may also be exposed and thus define an exterior surface of the keyboard.

FIG. 11B illustrates a partial cross-sectional view of an example electronic device 1110, which may be an embodiment of the device 100, FIG. 1. The cross-sectional view shown in FIG. 11B may correspond generally to a view along line A-A in FIG. 1 (or a similarly positioned line through a different device).

The device 1110 includes a substrate 1112 (which may be an embodiment of the substrate 328, FIG. 3B, or any other substrate or keyboard feature plate described herein), a structural web 1114 (which may be an embodiment of the structural web 310, FIG. 3B), a flexible cover 1116 (which may be an embodiment of the flexible cover 324, FIG. 3B), and a keycap 1118. The device 1110 may define a space 1119 below the keycap 1118 in which a switch assembly may be positioned. The switch assembly may include components that facilitate mechanical and electrical operations of the keyboard.

FIG. 11B illustrates a device 1110 in which portions of the flexible cover 1116 are positioned in recesses 1117 in the structural web 1114. The flexible cover 1116 may be assembled with the structural web 1114 in a manner similar to the process described with respect to FIG. 10D, where the structural web 1114 and the flexible cover 1116 are assembled together during the process of forming the structural web 1114. For example, the carbon fiber for the lower portions 1113 of the structural web 1114 may be positioned in a mold, after which the flexible cover 1116 may be positioned on top of the lower portions 1113. Web portions of the structural web 1114 (e.g., the portions above the flexible cover 1116) may then be formed (e.g., using the same continuous fiber that was used to form the lower portions 1113). The matrix material of the structural web 1114 may then be cured to form a rigid assembly. In some cases, the flexible cover 1116 is at least partially cured during the curing of the matrix material of the structural web 1114, thus resulting in an at least partially unitary and/or integrated matrix between the structural web 1114 and the flexible cover 1116. In other cases, the flexible cover 1116 is not integral with the matrix of the structural web 1114. The structural web 1114 may pass through openings in the flexible cover 1116, as shown. More particularly, the flexible cover 1116 may define openings that are adjacent to and at least partially surround the keycap openings, and the narrowed portion of the structural web 1114 (corresponding to the recesses 1117) may extend through those openings. In some cases, the openings that into which the structural web 1114 extend do not completely sever or separate the flexible cover 1116 into multiple different segments, but instead the flexible cover 1116 may be a single segment with multiple discontinuous openings.

FIG. 11C illustrates a partial cross-sectional view of an example electronic device 1120, which may be an embodiment of the device 100, FIG. 1. The cross-sectional view shown in FIG. 11C may correspond generally to a view along line A-A in FIG. 1 (or a similarly positioned line through a different device).

The device 1120 includes a substrate 1122 (which may be an embodiment of the substrate 328, FIG. 3B, or any other substrate or keyboard feature plate described herein), a structural web 1124 (which may be an embodiment of the structural web 310, FIG. 3B), a flexible cover 1126 (which may be an embodiment of the flexible cover 324, FIG. 3B), and a keycap 1128. The device 1120 may define a space 1129 below the keycap 1128 in which a switch assembly may be positioned. The switch assembly may include components that facilitate mechanical and electrical operations of the keyboard.

FIG. 11C illustrates a device 1120 in which the flexible cover 1126 is sandwiched between an upper portion 1121 and a lower portion 1125 of the structural web 1124. FIG. 11C also shows an example fiber orientation within the structural web 1124. For example, fibers 127 may be aligned so that the long axis of the fiber is substantially parallel to the length of the walls of the structural web 1124 (as illustrated by the ends of the fibers 1127 being visible in the cross-sectional view).

The structural web 1124 and the flexible cover 1126 may be assembled together in a manner similar to the process described with respect to FIGS. 10D and 11B, where the structural web 1124 and the flexible cover 1126 are assembled together during the process of forming the structural web 1124. For example, the carbon fiber for the lower portion 1125 of the structural web 1124 may be positioned in a mold, after which the flexible cover 1126 may be positioned on top of the lower portion 1125. The upper portion 1123 of the structural web 1124 may then be formed on top of the flexible cover 1126. In this example, the upper portion 1123 may be formed of or include a single, continuous carbon fiber, and the lower portion 1125 may be formed of or include a single, continuous carbon fiber, though the fibers for the upper and lower portions may not be the same fiber (e.g., they may be discontinuous fibers). After the carbon fibers for the upper and lower portions 1123, 1125 are positioned above and below the flexible cover 1126, respectively, the matrix material may be cured. In some cases, the flexible cover 1126 is at least partially cured during the curing of the matrix material of the upper and lower portions 1123, 1125, thus resulting in an at least partially unitary and/or integrated matrix between the structural web 1124 and the flexible cover 1126. In other cases, the matrix material of the upper and lower portions 1123, 1125 may adhere or bond to the flexible cover 1126 to form an integrated component. In other cases, the upper and lower portions 1123, 1125 may be formed (and at least partially cured) separately from one another, and the flexible cover 1126 may be secured between them using adhesives or other bonding agents.

Figure 11D:
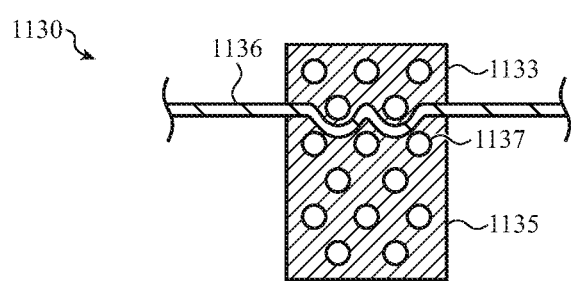
FIG. 11D is a partial cross-sectional view of an example electronic device with a structural web.

FIG. 11C shows an example configuration in which the flexible cover 1126 is substantially flat or planar in the region between the upper and lower portions 1123, 1125. FIG. 11D shows an example configuration in which a flexible cover 1136 has a folded or otherwise non-planar shape. More particularly, FIG. 11D illustrates a partial cross-sectional view of a device 1130, which may be similar to the device 1120 except in the shape of the portion of the flexible cover 1136 that is between the upper and lower portions 1133, 1135 of the structural web. This configuration may allow the carbon fibers 1137 to reside in the loops and contours defined by the folded portion of the flexible cover 1136, which may increase the strength of the bond between the flexible cover 1136 and the structural web, or otherwise improve a mechanical property of the assembly that includes the upper and lower portions 1133, 1135 and the flexible cover 1136.

Figure 12A:
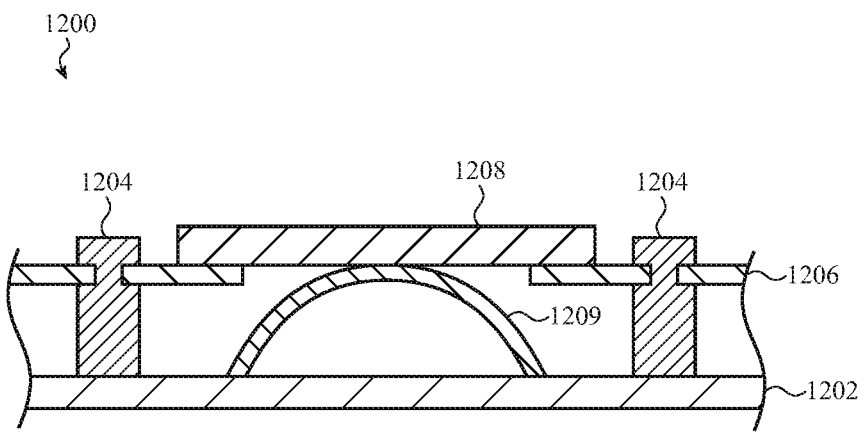
FIG. 12A is a partial cross-sectional view of an example electronic device with a structural web, showing a key in an unactuated state.
Figure 12B:
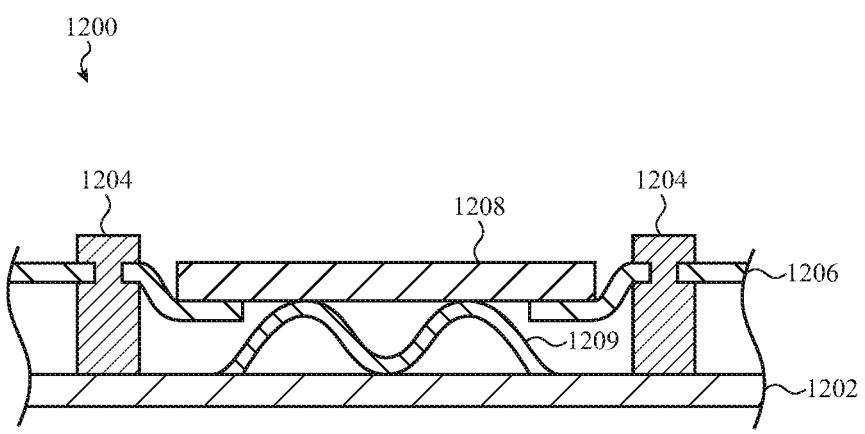
FIG. 12B is a partial cross-sectional view of an example electronic device with a structural web, showing the key of FIG. 12A in an actuated state.

FIGS. 11A-11C illustrate example devices in which a flexible cover is attached to or integrated with a structural web. In each case, a switch assembly may be positioned under the keycap and the flexible cover to provide input detection functionality and mechanical support and tactile feedback for the keycaps. For example, the switch assemblies may include scissor or butterfly hinges to support the keycap, and a dome switch to detect key makes. In some cases, the mechanical support and/or tactile feedback functionalities may be provided by the flexible cover instead of (or in addition to) other mechanical support mechanisms such as scissor or butterfly hinges. FIGS. 12A-12B illustrate one such embodiment.

FIGS. 12A-12B illustrate partial cross-sectional views of an example electronic device 1200, which may be an embodiment of the device 100, FIG. 1. The cross-sectional view shown in FIGS. 12A-12B may correspond generally to a view along line A-A in FIG. 1 (or a similarly positioned line through a different device). FIG. 12A illustrates a key in an unactuated (e.g., undepressed) state, and FIG. 12B illustrates the key in an actuated (e.g., depressed) state.

The device 1200 may include a keycap 1208 that is attached to a flexible cover 1206. The flexible cover 1206 may be integrated with a structural web 1204, which may be attached to a substrate 1202. As shown, the flexible cover 1206, structural web 1204, and substrate 1202 are similar to the configuration shown in FIG. 11B, though other configurations are also contemplated.

The keycap 1208 may be attached to the flexible cover 1206 such that the flexible cover 1206 mechanically supports the keycap 1208 above a switching element 1209 (which may be a dome switch or any other component that detects actuation of the keycap 1208). When the keycap 1208 is depressed or actuated, the flexible cover 1206 may deform to allow the keycap 1208 to move and engage the switching element 1209. FIG. 12B shows the device 1200 in an actuated state in which the flexible cover 1206 is deformed and/or deflected in response to an application of force on the keycap 1208. The switching element 1209, shown as a dome switch, is collapsed, resulting in the detection of a key press. Once the actuation force is removed from the keycap 1208, the flexible cover 1206 may return the keycap 1208 to the position shown in FIG. 12A.

The deformation of the flexible cover 1206 may provide a resistance force, and optionally a "click" feel, when the keycap 1208 is actuated. Further, the flexible cover 1206 may movably support the keycap 1208 between an actuated position (FIG. 12B) and an unactuated position (FIG. 12A). Accordingly, the flexible cover 1206 may provide several functionalities to the key, and may thus allow the omission of other components, such as hinges, mechanical supports, and the like. Further, because these functions are provided at least in part by the flexible cover 1206, the switching element 1209 may not need to provide such functions. This may allow a wider range of switching elements to be used, as it may not be necessary for the switching element to provide a force to return the keycap to an unactuated state, for example.

Figure 13A:
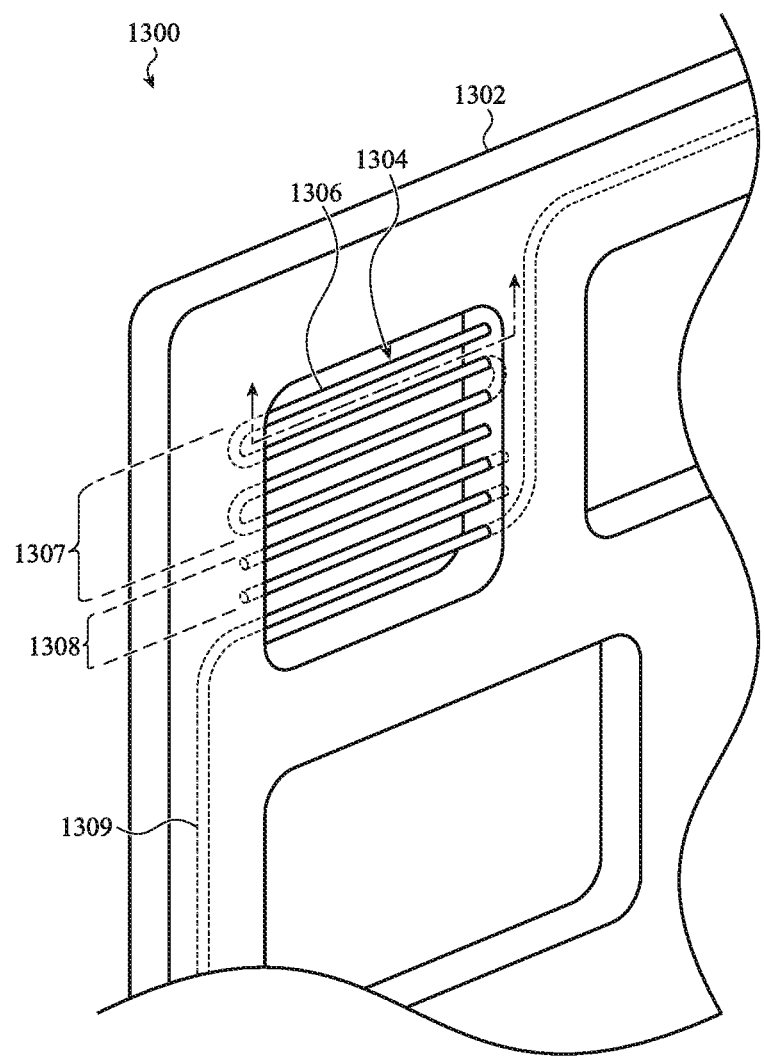
FIG. 13A is a partial view of an example structural web.
Figure 13B:
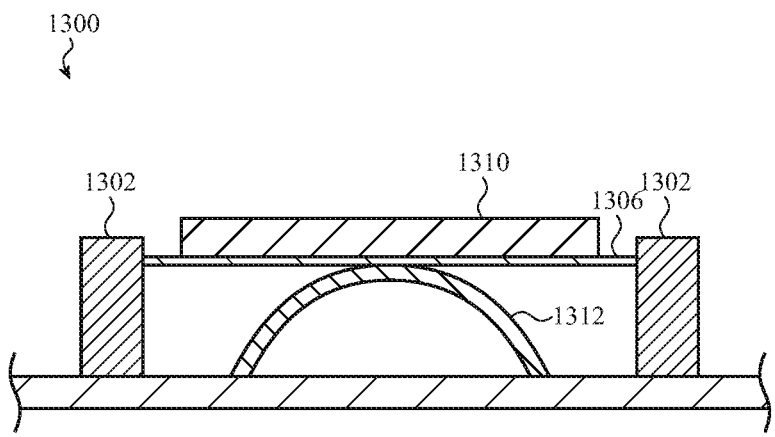
FIG. 13B is a partial cross-sectional view of a device with the structural web of FIG. 13A, showing a key in an unactuated state.
Figure 13C:
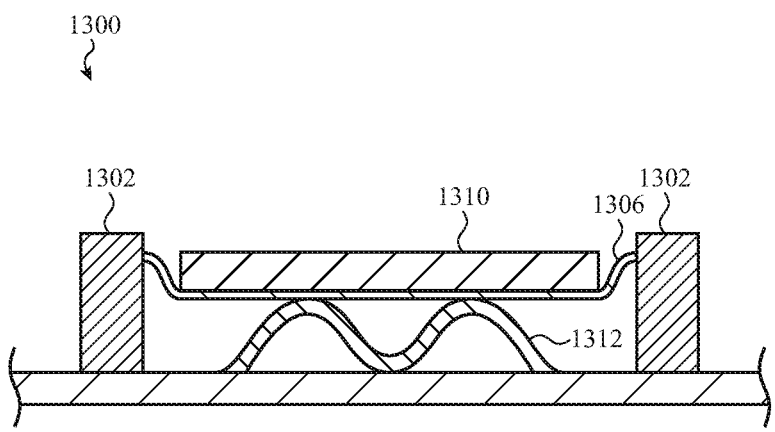
FIG. 13C is a partial cross-sectional view of the device shown in FIG. 13B, showing the key in an actuated state.

FIGS. 12A-12B illustrate devices in which a flexible cover provides mechanical and/or tactile functionality to a key of a keyboard. Forming a structural web from carbon fiber as described herein may allow for the integration of other types of structures and mechanisms that provide similar functionality. FIGS. 13A-13C illustrate an example device 1300 in which fibers extend over a key opening in a structural web and provide various mechanical and/or electrical functions to the key.

FIG. 13A is a partial view of a device 1300, showing a portion of a structural web 1302. The portion of the structural web 1302 shown in FIG. 13A may correspond to an area similar to the area B-B in FIG. 4F (or a similar area of any other structural web described herein). The structural web 1302 may be formed of a carbon fiber material as described herein, and may define a key opening 1304. Fibers 1306 may be integrated with the structural web 1302 and may extend across the key opening 1304. The fibers 1306 may be any suitable material. For example, the fibers 1306 may be carbon fibers. In such cases, the fibers 1306 may be a portion of a continuous carbon fiber that also forms the structural web 1302. In such cases, the fiber may be positioned over the opening 1304 as part of the carbon lay-up process for the structural web 1302. In other cases, the fibers 1306 may be separate or discontinuous fibers that are integrated with the other carbon fibers of the structural web 1302. The fibers 1306 may be encapsulated in a matrix material (e.g., the same matrix material as the other portions of the structural web 1302 or a different matrix material), or they may remain uncoated. In some cases, the fibers 1306 remain uncoated or treated with a matrix material that allows the fibers 1306 to elastically deform, as described with respect to FIGS. 13B-13C. The fibers 1306 may be formed from or include any suitable material. For example, they may be carbon fiber (e.g., the same or a different carbon fiber than that used for the bulk of the structural web 1302), a polymer material, an elastic polymer material, metal, amorphous metal, an alloy, aramid, or the like.

FIG. 13A illustrates various ways that the fibers 1306 may be integrated with the structural web 1302. For example, a single fiber segment 1307 may define a serpentine path that is anchored in the matrix of the structural web 1302 and makes several passes across the key opening 1304. As another example, a single fiber segment 1309 that also forms walls of the structural web 1302 may have a segment that passes across the key opening 1304 between segments that define the walls of the structural web 1302. The fiber segments 1307, 1309 may be a portion of a single fiber that forms the structural web 1302, as described above. As yet another example, multiple discrete fibers 1308 may extend across the opening 1304, with their respective ends anchored in the matrix of the structural web 1302. While FIG. 13A shows three different configurations of fiber segments in one key opening, this is merely for illustrative purposes, and a given implementation of a structural web may include only one configuration of the fiber segments (e.g., either a serpentine fiber segment such as the segment 1307, a group of individual discrete fiber segments such as the segments 1308, or segments of fibers where the portion extending across the opening is between portions defining sidewalls such the segment 1309). Alternatively, the segments extending across the opening may include combinations of these or configurations of fiber segments.

The fibers 1306 may provide various functions to a key of a keyboard. For example, the fibers 1306 may movably support a keycap 1310 above a switching element, in a manner similar to the flexible cover 1206 in FIGS. 12A-12B. FIGS. 13B-13C illustrate partial cross-sectional views of the example electronic device 1300. The cross-sectional view shown in FIGS. 13B-13C may correspond generally to a view along line C-C in FIG. 13A (or a similarly positioned line through a different device), and may include components not shown in FIG. 13A (e.g., a substrate, a keycap, and a switching element). FIG. 13B illustrates a key in an unactuated or undepressed state, and FIG. 13C illustrates the key in an actuated or depressed state.

The device 1300 may include a keycap 1310 that is attached to the fibers 1306. The keycap 1310 may be attached to the fibers 1306 such that the fibers 1306 mechanically support the keycap 1310 above a switching element 1312 (which may be a dome switch or any other component that detects actuation of the keycap 1310). For example, the keycap 1310 may be attached to the fibers 1306 using an adhesive, or the keycap 1310 may be molded around the fibers 1306 such that the material of the keycap 1310 encapsulates at least a portion of the fibers 1306.

When the keycap 1310 is depressed or actuated, the fibers 1306 may deform to allow the keycap 1310 to move and engage the switching element 1312. FIG. 13C shows the keycap 1310 in an actuated state in which the fibers 1306 are deformed and/or deflected in response to an application of force on the keycap 1310. The switching element 1312, shown as a dome switch, is collapsed, resulting in the detection of a key press. Once the actuation force is removed from the keycap 1310, the fibers 1306 may return the keycap 1310 to the position shown in FIG. 13B.

The deformation of the fibers 1306 may provide a resistance force when the keycap 1320 is actuated. Further, the fibers 1306 may movably support the keycap 1310 between an actuated position (FIG. 13C) and an unactuated position (FIG. 13B). Accordingly, the fibers 1306 may provide several functionalities to the key, and may thus allow the omission of other components, such as hinges, mechanical supports, and the like. Further, because these functions are provided at least in part by the fibers 1306, the switching element 1312 may not need to provide such functions. This may allow a wider range of switching elements to be used, as it may not be necessary for the switching element to provide a force to return the keycap to an unactuated state, for example.

In some cases, the fibers 1306 may provide other functionalities instead of or in addition to the mechanical support functions described above. For example, the fibers 1306 may be formed from a light-transmissive material such as a fiber optic material. In such cases, light from a light source (e.g., an LED) may be carried by the fibers 1306 and emitted from the fibers 1306 along the portions that span the opening

1304. In such cases, light receiving portions of the fibers 1306 may be exposed along a surface of the structural web 1302, and light may enter the fibers 1306 through the light receiving portions. The fibers 1306 may also include light extracting features (e.g., lens features, surface textures, grooves, etc.) along the portions that span the opening 1304, which may extract the light. The extracted light may be used to illuminate a glyph on the keycap 1310, or surrounding areas of the keyboard (e.g., the structural web, etc.).

As another example, the fibers 1306 may be conductive and may be configured to carry electrical signals or even act as electrodes for sensing functions. For example, the fibers 1306 may be formed of or include a conductive material such as a metal. The conductive fibers 1306 may be connected to various types of electrical circuitry. In some cases, the conductive fibers 1306 are connected to sensing circuitry and act as electrodes for a touch and/or a force sensor that detects touch- and/or force-based inputs to the keycap 1310. The sensing circuitry may use any suitable sensing technology or techniques, such as a capacitive sensor, inductive sensor, resistive sensor, piezoelectric sensor, strain-gauge-based sensor, or the like. In the case of capacitive sensors, sensing circuitry may detect electrical changes caused by the proximity of a finger to the fibers 1306. When a detection threshold is reached (e.g., indicating that a finger is sufficiently close to or in contact with the keycap 1310 or the fibers themselves), the sensing circuitry may register that the key has been actuated.

Where the fibers 1306 are conductive and are used to carry electrical signals (e.g., for touch and/or force sensing, or simply for electrical signal routing), the fibers 1306 may have or be connected to exposed conductive terminals on the structural web 1302, thus allowing access to the conductors. The conductors may be electrically isolated from other conductors within the structural web, for example, by jacketing or insulating the conductors so that they do not short against adjacent carbon fibers or other conductive materials. Further, where the fibers 1306 are conductive and/or are used to carry electrical signals, they may not be configured to deform or provide the mechanical support functions described above with respect to FIGS. 13B-13C. And while the fibers 1306 are shown as being positioned generally towards the top of the opening 1304 and in contact with the keycap 1310, other configurations are also contemplated. For example, the fibers 1306 may be positioned nearer the bottom of the opening 1304, and the keycap 1310 may be positioned above and not in contact with the fibers 1306.

Figure 14A:
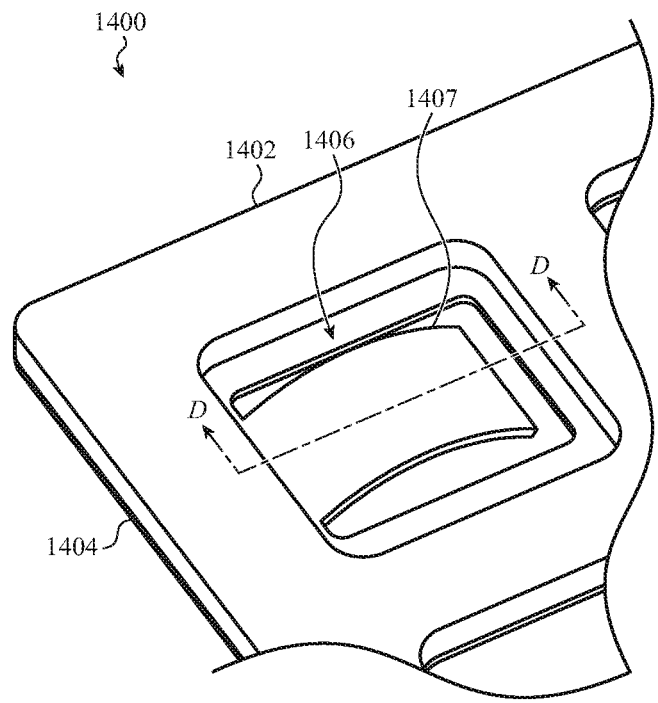
FIG. 14A is a partial view of an example structural web and substrate.
Figure 14B:
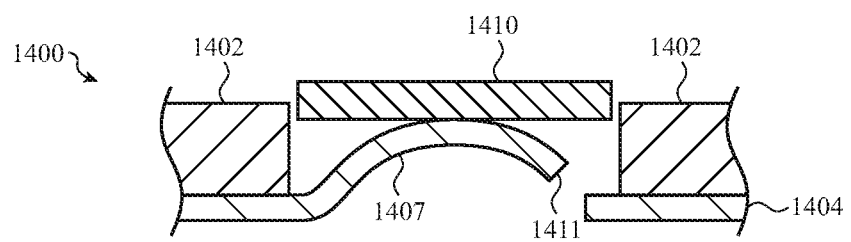
FIG. 14B is a partial cross-sectional view of an example device with the structural web of FIG. 14A.
Figure 14C:
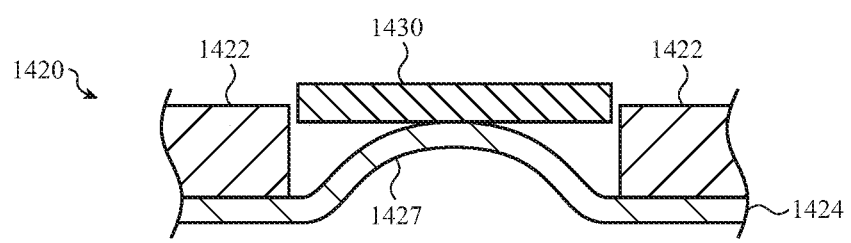
FIG. 14C is a partial cross-sectional view of an example device with the structural web of FIG. 14A.

FIGS. 14A-14C depict an example device 1400 in which mechanical functionality of a key is provided by features of a substrate that may be integrally formed with or attached to a structural web as described herein. FIG. 14A is a partial view of a device 1400, showing a portion of a structural web 1402 and a substrate 1404. The portion of the structural web 1402 shown in FIG. 14A may correspond to an area similar to the area B-B in FIG. 4F (or a similar area of any other structural web described herein). The structural web 1402 may be formed of a carbon fiber material as described herein, and may define a key opening 1406. The substrate 1404 may be formed of a carbon fiber material, and may be co-cured with or attached to the structural web 1402. In some cases, the structural web 1402 and the substrate 1404 may be formed together (e.g., using a single carbon fiber or a common reinforcement structure) such that they define a single structural component.

The substrate 1404 may define a spring member 1407. The spring member 1407 may be integrally formed with the substrate 1404. For example, the substrate 1404 may be formed of carbon fiber, allowing detailed shapes, such as the spring member 1407, to be formed or molded directly into the substrate 1404 as part of the manufacturing process. Accordingly, the spring member 1407 may be part of a monolithic substrate 1404.

The spring member 1407 may provide various functions to a key of a keyboard. For example, the spring member 1407 may movably support a keycap 1410 and optionally provide tactile feedback such as a "click" or detent sensation when the keycap 1410 is actuated. FIG. 14B illustrates a partial cross-sectional view of the electronic device 1400. The cross-sectional view shown in FIG. 14B may correspond generally to a view along line D-D in FIG. 14A (or a similarly positioned line through a different device), and may include components not shown in FIG. 14A (e.g., a keycap).

As shown in FIG. 14B, the spring member 1407 is cantilevered from the substrate 1404, such that the spring member 1407 defines a free end 1411. This configuration may produce a particular tactile sensation when the keycap 1410 is depressed. For example, the spring member 1407 may provide a substantially continuous or continuously increasing force response as the keycap 1410 is depressed.

FIG. 14C illustrates a partial cross-section of another example electronic device 1420, which is similar to the device 1400 except that the spring member 1427 may not be cantilevered, and instead joins the substrate 1424 at two ends (or more) of the spring member 1437. As shown, the spring member 1427 joins the substrate 1424 at opposite ends, though other configurations are also contemplated.

The physical constraints on the spring member 1427 from being joined to the substrate 1424 at two ends may cause the spring member 1427 to produce a tactile (and optionally audible) click or detent when pressed. The click or detent may be produced by an inflection in a force response of the spring member 1427. For example, as the spring member 1427 is deflected downwards, the force response may increase until it reaches a certain amount of deflection, at which point the force response may briefly decrease, resulting in a feeling of a click or detent. After that point, the force response may increase again.

The spring members 1407, 1427 may be used to produce the tactile output, and may also provide a biasing force that returns the keycaps 1410, 1430 to unactuated positioned. The spring members 1407, 1427 may also provide electrical switching functionality, such as by closing an electrical circuit when the spring members are deflected. In some cases, other switching and/or key-make sensing components are used to detect key actuations. Further, other mechanical components such as supports, hinges (e.g., butterfly hinges, scissor hinges), guides, and the like may be used in conjunction with the spring members 1407, 1427 to provide other functionality and to support the keycaps.

While the features described with respect to FIGS. 13A-14C are shown in one key opening, it will be understood that a keyboard may include these features in some or all of the key openings of the keyboard.

Figure 15A:
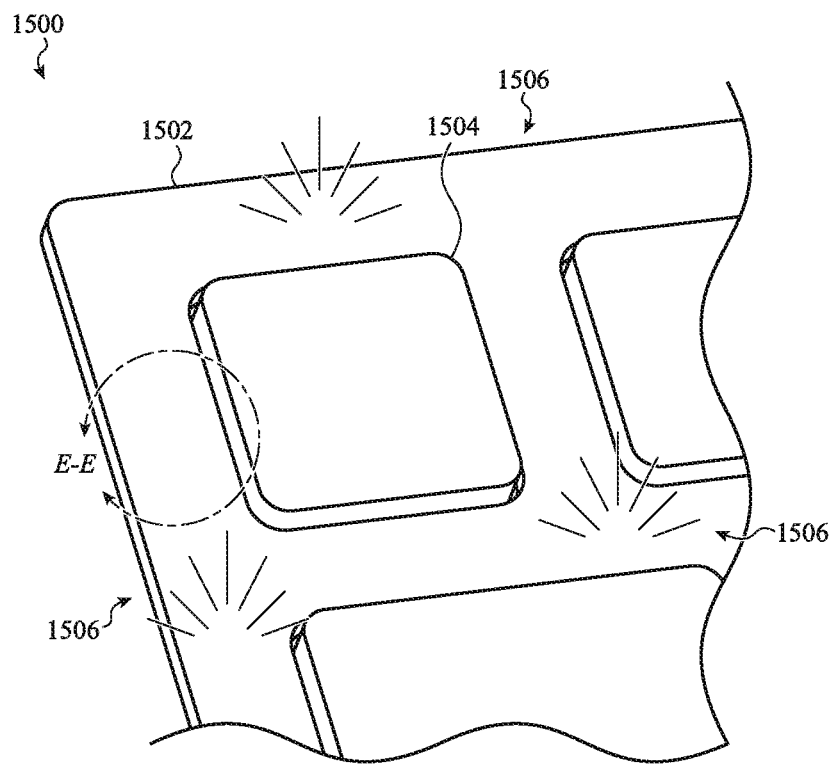
FIG. 15A is a partial view of an example device with a structural web.
Figure 15B:
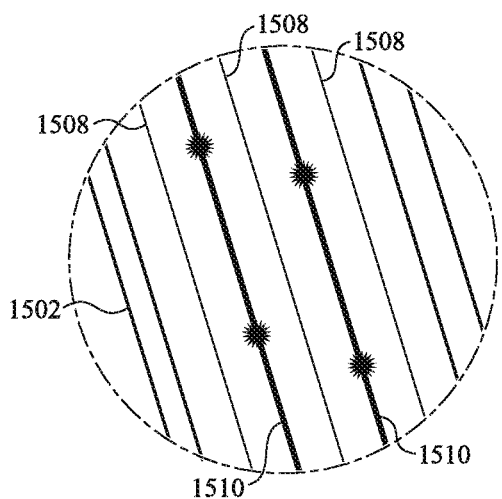
FIG. 15B is a detail view of the structural web of FIG. 15A.

As noted above, the additive process by which structural webs are formed may allow the integration of other components, materials, fibers, or the like, in addition to the structural carbon fibers and the matrix material. FIGS. 15A-15B illustrate an example in which optical fibers are incorporated into a structural web to produce illumination effects.

FIG. 15A is a partial view of a device 1500, showing a portion of a structural web 1502. The portion of the structural web 1502 shown in FIG. 15A may correspond to an area similar to the area B-B in FIG. 4F (or a similar area of any other structural web described herein). The structural web 1502 may be formed of a carbon fiber material as described herein, and may define a key opening with a keycap 1504 positioned at least partially in the opening.

The structural web 1502 may include light-transmissive fibers (or light sources) that can emit light 1506 to illuminate portions of the structural web 1502. In cases where the structural web 1502 is under another component, such as flexible cover, light emitted by the integrated light-transmissive fibers may illuminate the overlying component. Illumination may be used for aesthetic and/or functional purposes, such as to illuminate glyphs or other input regions.

FIG. 15B is a detail view of the area E-E in FIG. 15A, illustrating an example fiber configuration of the structural web 1502. The structural web 1502 may include carbon fibers 1508 (or other structural fibers), which form the bulk of the structural web 1502 as described above. The structural web 1502 may also include light-transmissive fibers 1510 that are embedded in the structural web 1502 and at least partially encapsulated and/or secured by the matrix material. The light-transmissive fibers 1510 may be positioned so that they are at or near the top of the structural web 1502 so that light emitted from the fibers 1510 is visible to a user. The light-transmissive fibers 1510 may be incorporated into the structure of the structural web 1502 using the techniques described above for other fibers and/or components.

The light-transmissive fibers 1510 may be formed from or include any suitable materials, such as glass, acrylic, polymer, or the like. The light-transmissive fibers 1510 may have exposed light receiving portions into which light may be directed. The light-transmissive fibers 1510 may also include light extraction features such as lens features, surface textures, grooves, etc., at locations where the light is to be emitted from the light-transmissive fibers 1510 (e.g., rather than being transmitted further along the fiber without being emitted through a side wall of the fiber). These features may allow light to escape the light-transmissive fibers 1510 through the sides of the fibers where desired, while capturing and propagating the light where light emission is undesirable or unnecessary.

Figure 16:
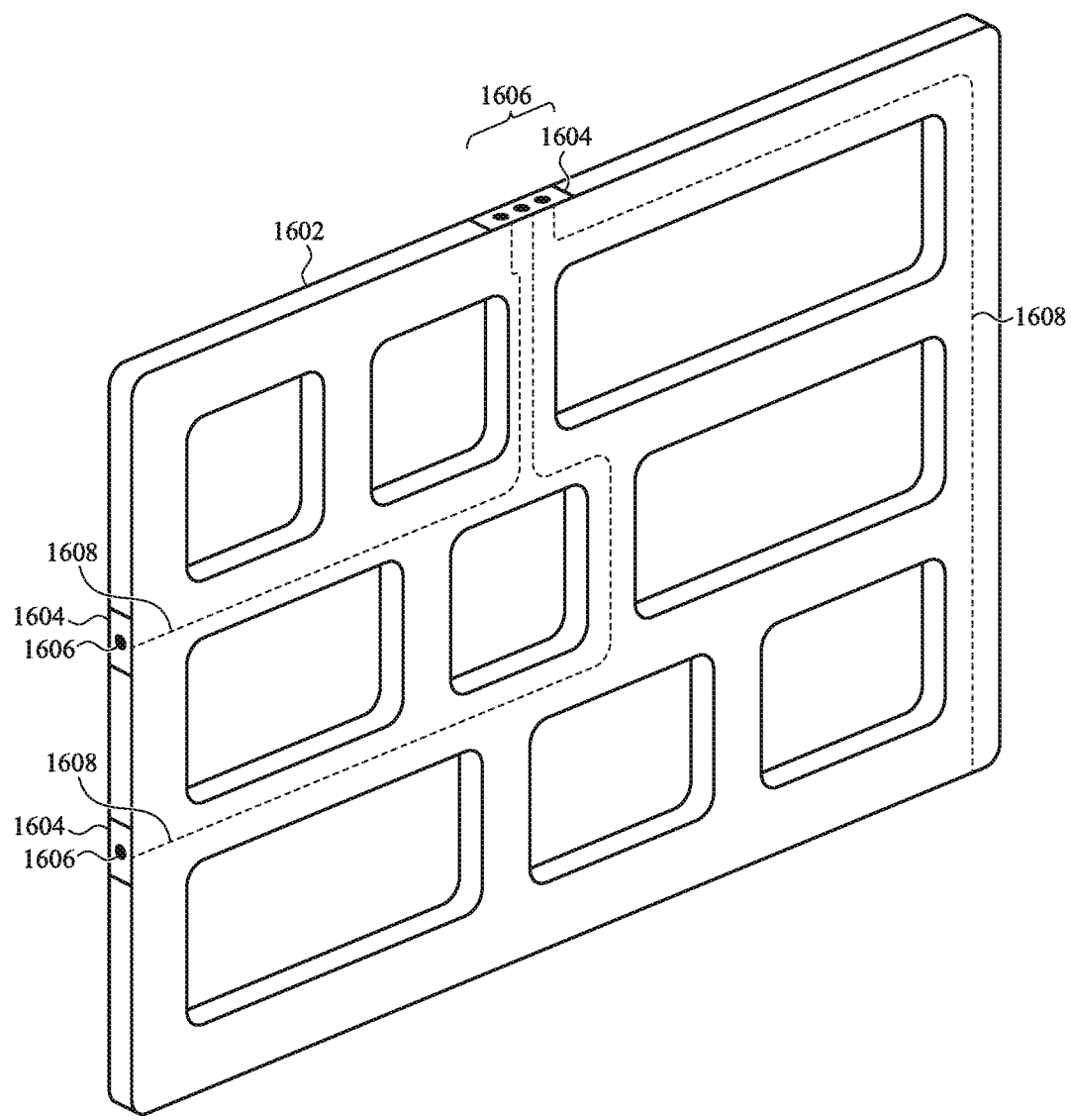
FIG. 16 illustrates an example structural web with conductive conduits.

FIG. 16 illustrates an example structural web 1602 in which conductive conduits 1608 are integrated with the structural web 1602 to route signals between various locations and/or components of a device. The structural web 1602 has a shape and configuration similar to that shown in FIG. 4F, though this is merely one example, and the same features described with respect to the structural web shown in FIG. 16 may equally apply to other structural webs shown or described herein. As described herein, the structural web 1602, which may be used as a key web and may define external surfaces of a device such as a laptop computer, may also include conductive conduits that form electrical interconnects between internal components of the laptop.

The structural web 1602 may include conductive conduits 1608 that are incorporated into the matrix material of the structural web 1602 using the techniques described above (e.g., placing them in a mold along with the structural carbon fibers and encapsulating the conduits and carbon fibers in a matrix material). The conductive conduits 1608 may be conductive wires, traces, fibers, or any other suitable conductive material. The conductive conduits 1608 may terminate at connectors 1604 that include terminals 1606 to couple to other components. The connectors 1604 may be integrated with the structural web 1602 in the same or similar manner as other components, fibers, and the like, as described above.

The conductive conduits 1608 and associated connectors may allow the structural web 1602 to act as an electrical interconnecting structure for multiple components. For example, the conductive conduits 1608 may carry power from a battery to multiple different components. As another example, a conductive conduit 1608 may carry a signal from an input device (e.g., a button, key, switch, etc.) to a processor or other circuitry. As yet another example, a conductive conduit 1608 may carry signals from an antenna to communication circuitry, or even itself act as a radiating and/or receiving structure of an antenna.

While the description of FIG. 16 relates to conductive conduits, the same or similar configuration may be used for other types of conduits as well. For example, the conductive conduits 1608 may instead be optical conduits (e.g., fiber optic strands), and the connectors 1604 may include optical connectors.

Figure 17:
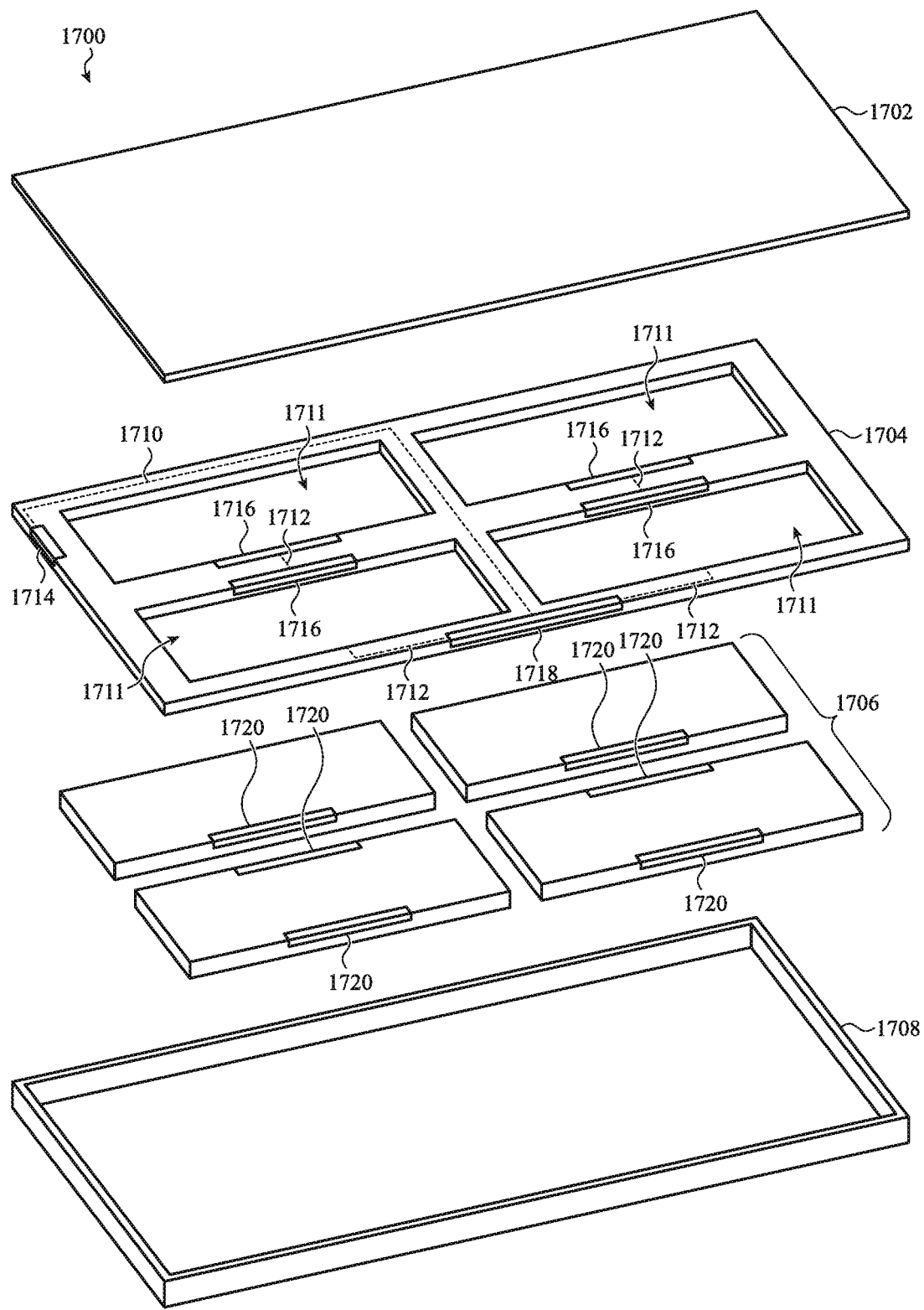
FIG. 17 is a sample exploded view of an example device having a structural web.

FIG. 17 illustrates an exploded view of a portion of a device 1700. The device 1700 may correspond to laptop computer, and more particularly to a base portion of a laptop computer. The device 1700 includes an internal interconnect web 1704 that is used to interconnect various components within the laptop. The interconnect web 1704 may be formed using the same or similar process as described above for other structural webs. The device 1700 may also include a housing component 1708 that may define one or more exterior walls of the device 1700 and may at least partially define an interior volume of the housing in which the circuit board 1702 and the interconnect web 1704 are positioned. In some cases, the interconnect web 1704 is attached to the housing component 1708 using fasteners, adhesives, mechanical interlocks, or the like.

The device 1700 includes a circuit board 1702. The circuit board 1702 may include processors, memory, and/or other circuitry that provide computing functions of a laptop. The device 1700 also includes an interconnect web 1704. The interconnect web 1704 may be formed of a continuous carbon fiber in a matrix material. The interconnect web 1704 may define openings 1711 in which other components may be positioned. For example, FIG. 17 illustrates batteries 1706 that may fit into the openings 1711.

The interconnect web 1704 may include conductive conduits 1710, 1712 formed into the matrix material of the interconnect web 1704, as described above, as well as connectors 1716, 1718 for connecting other components to the conductive conduits 1710, 1712. For example, the interconnect web 1704 may include battery connectors 1716 that conductively couple to corresponding connectors 1720 on the batteries 1706. The conductive conduits 1712 carry electrical power from the batteries 1706 through the interconnect web 1704 and to a circuit board connector 1718 (which may conductively couple to or otherwise interface with the circuit board 1702 to provide electrical power to the components on the circuit board 1702). The conductive conduit 1710 may conductively couple an embedded component 1714 to the circuit board connector 1718. The embedded component may be any suitable component, such as an antenna, light source, speaker, microphone, connector, sensor, or the like. The connectors 1716, 1718 and the embedded component 1714 may be embedded in the interconnect web 1704 using techniques described above, for example, by including them in a mold and at least partially surrounding them with the matrix material of the interconnect web 1704. Thus, FIG. 17 illustrates how various different types of interconnects may be formed in a single structural web formed of carbon fiber using the manufacturing process(es) described above. Further, because of the strength and/or stiffness of a carbon fiber web such as the interconnect web 1704, the interconnect web 1704 may provide the interconnect functionality described above while also producing a device that is stronger, stiffer, tougher, or otherwise improved relative to configurations without the interconnect web 1704.

Various structural webs described herein define key openings in which switch assemblies and keycaps may be positioned. As the keycaps are pressed downwards into the key openings, air pressure within the openings may increase due to the change in volume under the keycap. In order to prevent the increased air pressure from negatively affecting the function and/or tactile feel of the key mechanism, venting structures may be formed in a structural web to allow air to escape from under the keycap during key actuation (and to re-enter the volume under the keycap as the keycap is returning to an unactuated state).

Figure 18:
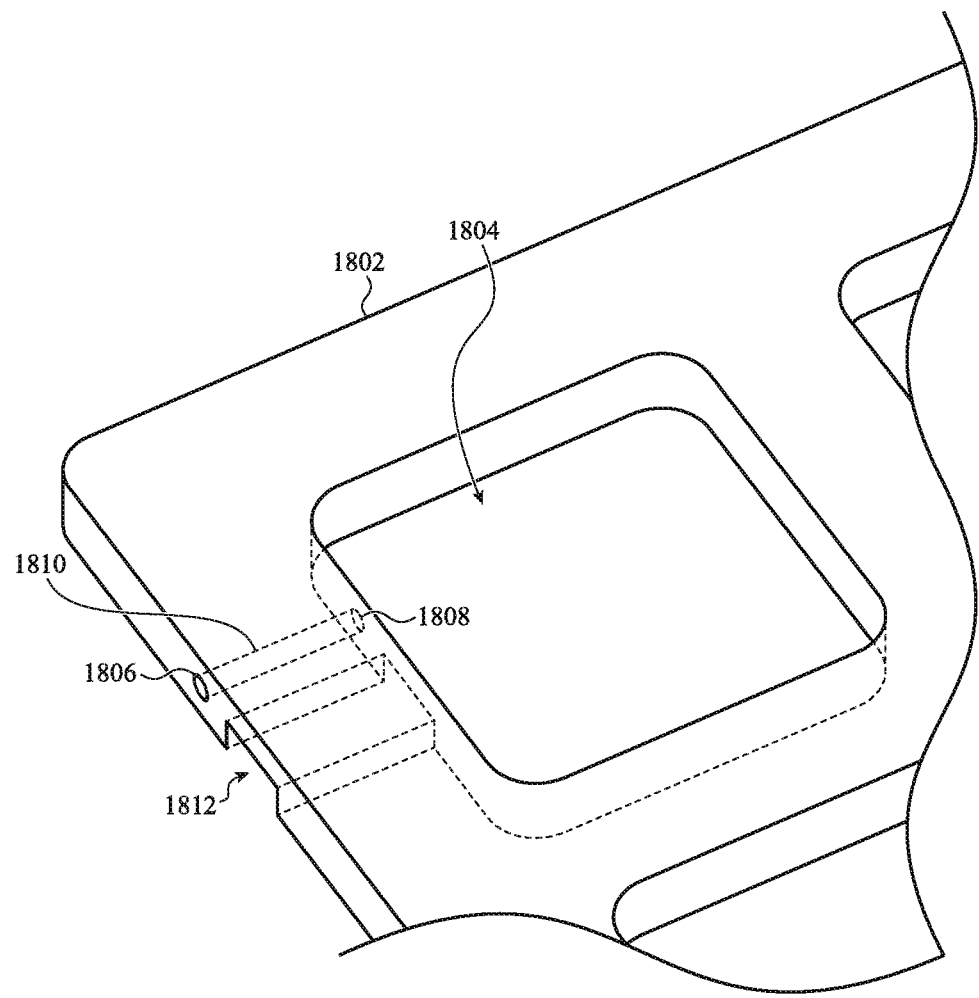
FIG. 18 is a partial view of a structural web having vent features.

FIG. 18 illustrates an example structural web 1802 that includes venting structures for allowing air to flow into and out of key openings 1804. In some cases, the structural web 1802 may define a channel 1812 that defines a vent path from the key opening 1804 to another volume or area. The channel 1812 may be formed during the molding process of the structural web 1802, as opposed to being machined after the web is cured, to ensure that no fibers in the structural web 1802 are severed and to maintain the structural integrity of the structural web 1802.

FIG. 18 also illustrates an air conduit 1810 that may be embedded in the structural web 1802. The air conduit 1810 may be a tube, hose, or other hollow structure. The air conduit 1810 may be positioned in the structural web 1802 so that a first opening 1808 communicates with the key opening 1804 and a second opening 1806 communicates with another volume (e.g., outside of the structural web 1802). The air conduit 1810 may be incorporated in the structural web 1802 in a manner similar to other components described herein, such as by placing the air conduit 1810 in a mold during a carbon layup process, encapsulating the air conduit 1810 and the carbon fiber in the matrix material, and then curing the matrix material.

Either or both of the air conduit 1810 and the channel 1812 may be used in any given implementation. Further, while FIG. 18 illustrates one air conduit 1810 and one channel 1812, other implementations may use multiple conduits or channels. For example, a structural web 1802 may include at least two channels 1812 for each key opening. The particular number and dimension of the air conduits 1810 and the channels 1812 may be selected to achieve a particular venting performance. In some cases all of the key openings in a structural web may be interconnected via air conduits 1810 and/or channels 1812, essentially forming an interconnected network so that air can move between various key openings and optionally an external space.

The foregoing structures may all be manufactured using a single carbon fiber layup process as described above with respect to FIGS. 4A-9. In some cases, other techniques are used in combination with the techniques in FIGS. 4A-9 for shaping, positioning, molding, curing, or otherwise producing the structures described herein. For example, in cases where a structural web is integrally formed or co-cured with another component (e.g., a substrate, a circuit board, etc.), the other component may include a woven carbon material that includes multiple discontinuous fibers. The web and the other component may be co-cured together so that they bond and form a unitary structure, despite not having a common carbon fiber reinforcing structure. In some cases, in addition to continuous carbon fibers, shorter, discontinuous fibers may be included as reinforcing material within the matrix. These fibers may intermingle with the fibers of various different components that are joined together. For example, chopped carbon fibers may be added to a mold in which a structural web (that includes a single continuous carbon fiber) and a substrate (that includes woven carbon fiber fabric) are being cured with a matrix material. The chopped or smaller fibers may thus form part of the reinforcing material of the final structure (e.g., the single carbon fiber web, the woven carbon fiber substrate, and the chopped carbon fiber may all form the carbon structure of the final, unitary component). Other combinations of carbon fiber reinforcement materials are also contemplated and may be used to produce the components described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device, comprising:
a display portion comprising a display; and
a base portion pivotally coupled to the display portion and comprising:
a housing;
a key web defining an aperture having four sides and comprising:
a matrix material; and
a continuous carbon fiber strand extending along at least two sides of the aperture and encapsulated in the matrix material; and
a keyboard coupled to the housing and comprising a keycap positioned at least partially in the aperture.

2. The electronic device of claim 1, wherein:
the key web defines multiple additional apertures; and
the keyboard further comprises a respective additional keycap positioned in each respective additional aperture.

3. The electronic device of claim 1, wherein the continuous carbon fiber strand at least partially defines each of the four sides.

4. The electronic device of claim 1, further comprising a conductive conduit encapsulated at least partially in the matrix material.

5. The electronic device of claim 4, wherein the conductive conduit conductively couples a first component of the electronic device with a second component of the electronic device.

6. The electronic device of claim 1, wherein:
the keyboard further comprises:
a substrate; and
a key assembly coupled to the substrate and movably supporting the keycap above the substrate; and
the key web is attached to the substrate.

7. The electronic device of claim 6, wherein:
the matrix material is a first matrix material;
the substrate comprises a second matrix material at least partially encapsulating a reinforcing material; and
the first and second matrix materials are co-cured to define a unitary matrix structure.

8. The electronic device of claim 1, wherein the electronic device is a notebook computer.

9. The electronic device of claim 1, further comprising a light-transmissive fiber encapsulated at least partially in the matrix material.

10. The electronic device of claim 9, wherein the light-transmissive fiber is configured to emit light from a surface of the key web.

11. The electronic device of claim 5, wherein the key web further comprises an electrical connector conductively coupled to the conductive conduit and configured to couple to the first component of the electronic device.

12. The electronic device of claim 1, further comprising a flexible cover attached to the key web.

13. The electronic device of claim 12, wherein:
the key web defines a recess; and
a portion of the flexible cover is captive in the recess.

14. The electronic device of claim 12, wherein the keycap is attached to the flexible cover.

15. The electronic device of claim 1, wherein:
the base portion further comprises a substrate positioned below the key web; and
the key web is attached to the substrate.

16. The electronic device of claim 1, wherein the continuous carbon fiber strand is of non-uniform diameter.

17. The electronic device of claim 1, wherein the key web further comprises a plurality of fiber segments at least partially encapsulated in the matrix material and extending across the aperture.

18. The electronic device of claim 17, wherein the keycap is supported by the plurality of fiber segments.

19. The electronic device of claim 18, wherein the plurality of fiber segments are configured to:
deform in response to an actuation force applied to the keycap; and
return the keycap to an unactuated position upon removal of the actuation force.

20. The electronic device of claim 1, wherein:
a first side of the aperture is defined by a first wall;
a second side of the aperture is defined by a second wall;
the first wall includes a first number of segments of the carbon fiber strand; and
the second wall includes a second number of segments of the carbon fiber strand that is different than the first number of segments.

* * * * *